(12) United States Patent
Watanabe et al.

(10) Patent No.: US 11,511,627 B2
(45) Date of Patent: Nov. 29, 2022

(54) DISPLAY DEVICE AND COMPUTER PROGRAM

(71) Applicant: AISIN CORPORATION, Kariya (JP)

(72) Inventors: Kenji Watanabe, Okazaki (JP);
Hiroyuki Miyake, Okazaki (JP);
Josaku Nakanishi, Okazaki (JP)

(73) Assignee: AISIN CORPORATION, Kariya (JP)

( * ) Notice: Subject to any disclaimer, the term of this patent is extended or adjusted under 35 U.S.C. 154(b) by 169 days.

(21) Appl. No.: 16/649,434

(22) PCT Filed: Jun. 27, 2018

(86) PCT No.: PCT/JP2018/024290
§ 371 (c)(1),
(2) Date: Mar. 20, 2020

(87) PCT Pub. No.: WO2019/097755
PCT Pub. Date: May 23, 2019

(65) Prior Publication Data
US 2020/0282832 A1 Sep. 10, 2020

(30) Foreign Application Priority Data
Nov. 17, 2017 (JP) .............................. JP2017-222167

(51) Int. Cl.
*B60K 35/00* (2006.01)
*G01C 21/36* (2006.01)

(52) U.S. Cl.
CPC ............ *B60K 35/00* (2013.01); *G01C 21/365* (2013.01); *B60K 2370/1529* (2019.05); *B60K 2370/166* (2019.05); *B60K 2370/80* (2019.05)

(58) Field of Classification Search
CPC ............ B60K 35/00; B60K 2370/1529; B60K 2370/166; B60K 2370/80; G01C 21/365
See application file for complete search history.

(56) References Cited

U.S. PATENT DOCUMENTS 5,485,009 A * 1/1996 Meyzonnetie .......... G01S 17/89
348/332
2008/0195315 A1 8/2008 Hu et al.
2010/0256900 A1 10/2010 Yamaguchi et al.
(Continued)

FOREIGN PATENT DOCUMENTS

JP  2005-069800 A  3/2005
JP  2006-214999 A  8/2006
(Continued)

OTHER PUBLICATIONS

Sep. 11, 2018 International Search Report issued in International Patent Application No. PCT/JP2018/024290.

*Primary Examiner* — Christopher E Leiby
(74) *Attorney, Agent, or Firm* — Oliff PLC

(57) ABSTRACT

Display devices and programs display a guide image on a display mounted on a vehicle so as to be visually recognized such that the guide image is superimposed on a view ahead of the vehicle. The guide image provides guidance about a travel direction of the vehicle that travels on a travel path after leaving a guide branch point. The devices and programs display the guide image in a manner such that a region overlapping a nearby object present on a near side of the travel path on which the vehicle travels is removed from the guide image.

10 Claims, 11 Drawing Sheets

(56) References Cited

U.S. PATENT DOCUMENTS

| | | | | |
|---|---|---|---|---|
| 2016/0003636 A1* | 1/2016 | Ng-Thow-Hing | ... | G06V 20/588 701/418 |
| 2016/0203629 A1* | 7/2016 | Takeda | ................. | H04N 13/239 345/632 |
| 2016/0349066 A1* | 12/2016 | Chung | ............... | G01C 21/3658 |
| 2020/0184219 A1* | 6/2020 | Mugura | ................. | B60K 35/00 |

FOREIGN PATENT DOCUMENTS

| | | |
|---|---|---|
| JP | 2006-284458 A | 10/2006 |
| WO | 2006/035755 A1 | 4/2006 |
| WO | 2009/084134 A1 | 7/2009 |

\* cited by examiner

DISPLAY DEVICE AND COMPUTER PROGRAM

TECHNICAL FIELD

Related technical fields include display devices and computer programs that support traveling of a vehicle.

BACKGROUND

Various means have been used as information providing means that provides an occupant of a vehicle with various types of information, such as route guidance and a warning for an obstacle, for supporting traveling of the vehicle. Examples of such tools include a liquid crystal display installed on the vehicle to provide visual indication and a speaker to output audio. One example of recent information providing means of this type is a device, such as a head-up display (hereinafter referred to as an "HUD") and a windshield display (hereinafter referred to as a "WSD"), that provides information by displaying an image superimposed on the surrounding environment (view) of the driver.

For example, Japanese Unexamined Patent Application Publication No. 2005-69800 (JP 2005-69800 A) discloses that, when providing route guidance, a navigation system causes a voice guidance device to provide a voice notification of a landmark (such as a convenience store) on the route, and causes an HUD to display a virtual image superimposed at the position of the landmark on the real view ahead of the vehicle. This allows the occupant to recognize the position of the landmark for turning right or left (that is, the position of the intersection to turn right or left), based on the position of the virtual image seen through the windshield.

SUMMARY

According to the technique disclosed in JP 2005-69800 A, the virtual image is displayed to be superimposed at the position of the landmark for turning right or left in the real view so as to be visually recognized by the occupant. However, the displayed virtual image is simply displayed to be superimposed over a part of the landmark, which makes the perspective relationship between the landmark and the virtual image unclear.

Exemplary embodiments of the broad inventive principles described herein address the foregoing issue of the related art, and therefore have an object to provide a display device and a computer program capable of accurately informing a vehicle occupant of a travel path to take by making clear the perspective relationship between a guide image and an object in the real view.

In order to achieve the above object, exemplary embodiments provide display devices and programs display a guide image on a display mounted on a vehicle so as to be visually recognized such that the guide image is superimposed on a view ahead of the vehicle. The guide image provides guidance about a travel direction of the vehicle that travels on a travel path after leaving a guide branch point. The devices and programs display the guide image in a manner such that a region overlapping a nearby object present on a near side of the travel path on which the vehicle travels is removed from the guide image.

According to the display device and the computer program having the above configuration, in the guide image that provides guidance about the travel direction after leaving the guide branch point, the region overlapping the nearby object present on the near side of the travel path on which the vehicle travels is excluded from a superimposition target. This allows the occupant of the vehicle to clearly recognize the perspective relationship between the position of the nearby object (for example, building, pedestrian, vehicle, and roadside tree) included in the real view and the position of the guide image. Accordingly, it is possible to accurately inform the vehicle occupant of the travel path to take.

DETAILED DESCRIPTION OF EXEMPLARY EMBODIMENTS

Hereinafter, a first embodiment and a second embodiment in which a display device is embodied as a superimposed image display device 1 will be described with reference to the drawings.

First Embodiment

Figure 1:
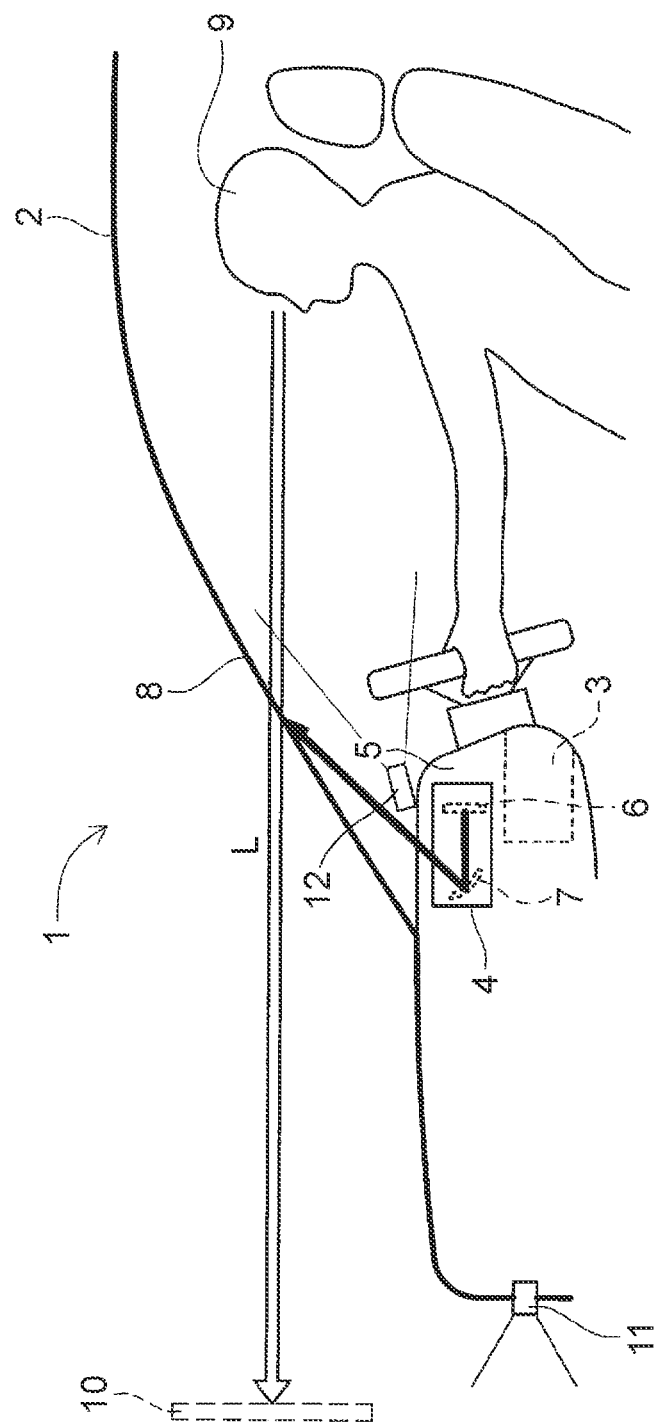
FIG. 1 is a schematic configuration diagram of a superimposed image display device according to a first embodiment.

First, the general configuration of the superimposed image display device 1 according to the first embodiment will be described with reference to FIG. 1. FIG. 1 is a schematic configuration diagram of the superimposed image display device 1 according to the first embodiment.

As illustrated in FIG. 1, the superimposed image display device 1 generally includes a navigation device 3 mounted on a vehicle 2, and a head-up display device (hereinafter referred to as an "HUD") 4 also mounted on the vehicle 2 and connected to the navigation device 3.

The navigation device 3 has functions for searching for a recommended route to the destination, displaying a map image around the current position of the vehicle 2 based on map data obtained from a server or stored in a memory, and providing travel guidance according to a set guide route together with the HUD 4. The navigation device 3 does not have to have all the functions described above. As long as the navigation device 3 has the function for providing travel guidance according to a set guide route, the functions can be implemented. The details of the structure of the navigation device 3 will be described below.

In contrast, the HUD 4 is disposed in a dashboard 5 of the vehicle 2, and includes therein a liquid crystal display 6 serving as an image display surface to display an image. The image projected on the liquid crystal display 6 is reflected on a windshield 8 in front of the driver's seat through a concave mirror 7 and so on of the HUD 4 as will be described below, so as to be visually recognized by an occupant 9 of the vehicle 2. The image that is displayed on the liquid crystal display 6 includes information about the vehicle 2 and various types of information used for assisting the occupant 9 in driving. For example, the image may include a warning that warns the occupant 9 of an object (other vehicles and pedestrians), a guide route set in the navigation device 3, guide information (such as an arrow pointing the right or left turning direction) based on the guide route, a warning to be displayed on the road surface (such as collision warning and speed limit warning), the current vehicle speed, an advertisement image, a guide sign, a map image, traffic information, news, a weather report, time, the screen of a connected smartphone, and a TV program.

The HUD 4 of the first embodiment is configured such that, when the occupant 9 sees the image displayed on the liquid crystal display 6 through reflection on the windshield 8, the image displayed on the liquid crystal display 6 is visually recognized by the occupant 9 as a virtual image 10 not on the windshield 8, but at a position far ahead of the windshield 8. The virtual image 10 is displayed to be superimposed on the view (real view) ahead of the vehicle, and may be displayed to be superimposed on any object (such as a road surface, a building, a moving object to pay attention to) located ahead of the vehicle. The virtual image 10 that the occupant 9 can see is the image displayed on the liquid crystal display 6, and the image may be reversed vertically or horizontally through the concave mirror 7 and other mirrors. Therefore, the image needs to be displayed on the liquid crystal display 6 considering such reversal. The size of the image is also changed through the concave mirror 7.

The position where the virtual image 10 is generated, more specifically, a distance (hereinafter referred to as an "imaging distance") L from the occupant 9 to the virtual image 10 can be appropriately set in accordance with the curvature of the concave mirror 7 of the HUD 4, the relative positions of the liquid crystal display 6 and the concave mirror 7, and so on. For example, if the curvature of the concave mirror 7 is fixed, the imaging distance L is determined by a distance (optical path length) along the optical path from the position where the image is displayed on the liquid crystal display 6 to the concave mirror 7. The optical path is set such that the imaging distance L is set to 2.5 m, for example.

Further, in the first embodiment, although the HUD 4 is used as the means for displaying an image to be superimposed on the view ahead of the vehicle, other means may be used. For example, a windshield display (WSD) that displays an image on the windshield 8 may be used. The WSD may display an image from a projector onto the windshield 8 serving as a screen, or the windshield 8 may be a transmissive liquid crystal display. As in the case of the HUD 4, the image displayed on the windshield 8 by the WSD is superimposed on the view ahead of the vehicle.

Alternatively, the image of the view ahead of the vehicle captured by a front camera 11 (described below) may be displayed on a vehicle-mounted liquid crystal display, and an image to be superimposed on the displayed view may be displayed on the same liquid crystal display. In this case, as in the case of the HUD 4, the image displayed on the liquid crystal display is superimposed on the view ahead of the vehicle.

Further, the front camera 11 is disposed on the upper side of the front bumper of the vehicle or on the back of the rearview mirror. The front camera 11 is an image capturing device having a camera using a solid-state image sensor such as a CCD, and is disposed such that the optical axis extends forward in the travel direction of the vehicle. Then, image processing is performed on a captured image captured by the front camera 11, so that the conditions of the front environment (that is, the environment on which the virtual image 10 is superimposed) visually recognized through the windshield 8 by the occupant 9 are detected. It should be noted that a sensor such as a millimeter-wave radar may be used in place of the front camera 11.

An in-vehicle camera 12 is disposed on the upper surface of the instrument panel of the vehicle. The in-vehicle camera 12 is an image capturing device having a camera using a solid-state image sensor such as a CCD, and is disposed such that the optical axis extends toward the driver's seat. The in-vehicle camera 12 captures an image of the face of the occupant 9 sitting in the driver's seat. Then, image processing is performed on the captured image captured by the in-vehicle camera 12, thereby detecting the position of the eyes of the occupant 9 (sight line start point) and the sight line direction.

Figure 2:
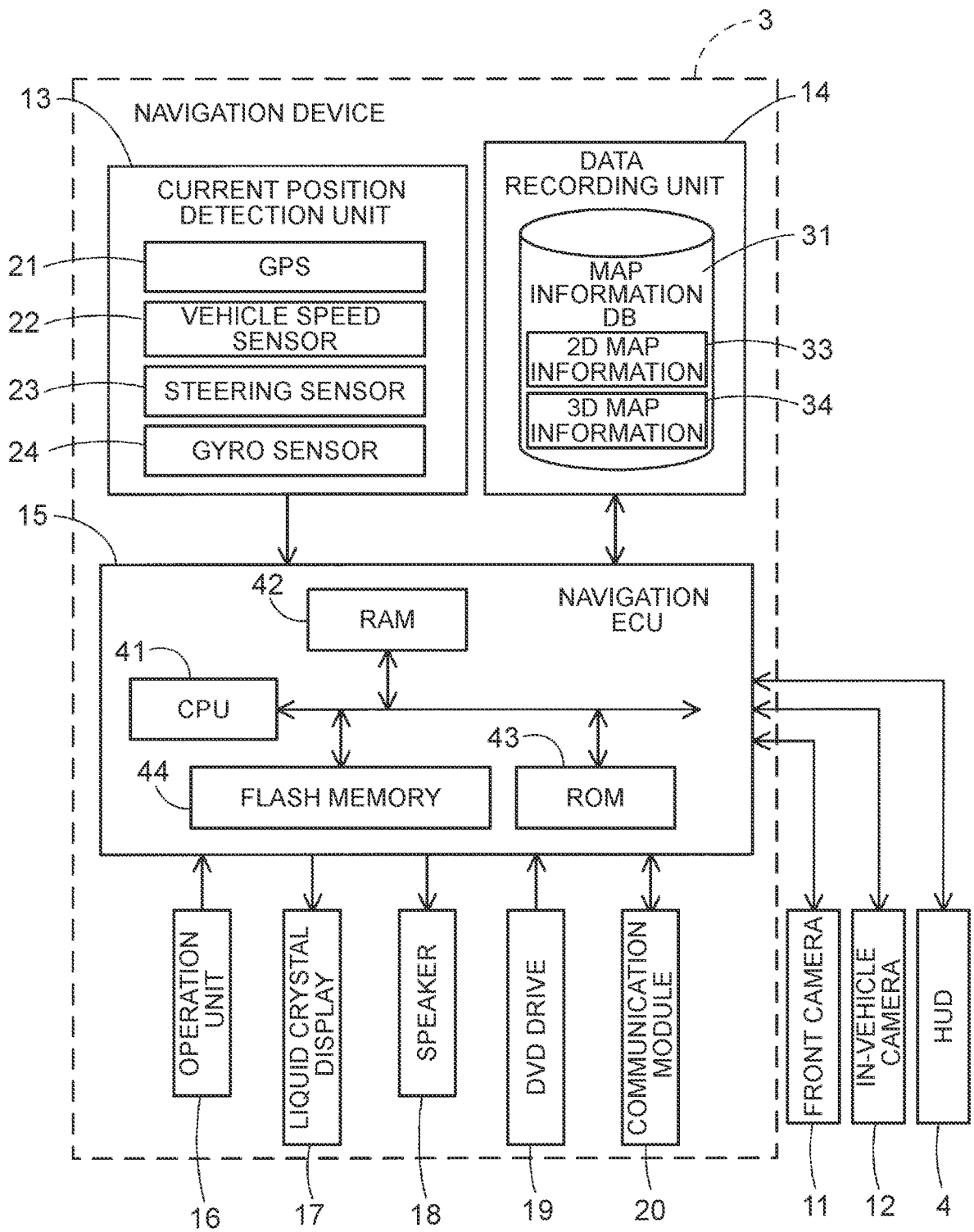
FIG. 2 is a block diagram illustrating a navigation device according to the first embodiment.

In the following, the general configuration of the navigation device 3 of the superimposed image display device 1 will be described with reference to FIG. 2. FIG. 2 is a block diagram illustrating the navigation device 3 according to the first embodiment.

As illustrated in FIG. 2, the navigation device 3 according to the first embodiment includes a current position detection unit 13 that detects a current position of the vehicle 2 on which the navigation device 3 is mounted, a data recording unit 14 in which various types of data are recorded, a navigation ECU 15 that performs various types of arithmetic processing based on received information, an operation unit 16 that receives an operation from the user, a liquid crystal display 17 that displays a map around the vehicle and facility information about facilities for the user, a speaker 18 that outputs voice guidance about route guidance, a DVD drive 19 that reads a DVD serving as a storage medium, and a communication module 20 that communicates with an information center such as the VICS (registered trademark: Vehicle Information and Communication System). (As used herein, the term "storage medium" does not encompass transitory signals.) Further, the HUD 4, the front camera 11, the in-vehicle camera 12, and so on described above are connected to the navigation device 3 via an in-vehicle network such as the CAN.

Hereinafter, the components of the navigation device 3 will be described one by one.

The current position detection unit 13 includes a GPS 21, a vehicle speed sensor 22, a steering sensor 23, and a gyro sensor 24, and is capable of detecting the current position of the vehicle, the direction, the travel speed of the vehicle, the current time, and so on. In particular, the vehicle speed sensor 22 is a sensor for detecting the travel distance of the vehicle and the vehicle speed. The vehicle speed sensor 22 generates pulses according to the rotation of the driving wheels of the vehicle, and outputs a pulse signal to the navigation ECU 15. Then, the navigation ECU 15 calculates the rotational speed of the driving wheels and the travel distance by counting the generated pulses. It should be noted that the navigation device 3 does not have to have all of the four types of sensors, and the navigation device 3 may have only one or more of these sensors.

The data recording unit 14 includes a hard disk (not illustrated) serving as an external storage unit and a storage medium, and a recording head (not illustrated) serving as a driver for reading the map information database 31 recorded in the hard disk and a predetermined program and writing predetermined data to the hard disk. The data recording unit 14 may include a flash memory, a memory card, and an optical disc such as a CD and a DVD. Further, the map information database 31 may be stored in an external server and obtained by the navigation device 3 through communication.

The map information database 31 stores two-dimensional map information 33 and three-dimensional map information 34. The two-dimensional map information 33 is map information used in the typical navigation device 3, and includes, for example, link data about roads (links), node data about nodes, facility data about facilities, search data used for route search processing, map display data for displaying a map, intersection data about intersections, and point retrieval data for retrieving a point.

Meanwhile, the three-dimensional map information 34 includes not only plane information but also height information so as to represent a map in three dimensions. In particular, in the present embodiment, the three-dimensional map information 34 is map information for representing the contour of roads, the shape of buildings, road lines, traffic lights, road signs, other signs, and so on in three dimensions. The three-dimensional map information 34 may also include other information than the contour of roads, the shape of buildings, road lines, traffic lights, road signs, and other signs described above. For example, the three-dimensional map information 34 may include information for representing roadside trees and road surface markings in three dimensions. Alternatively, a map on which objects such as the contour of roads, the shape of buildings, road lines, traffic lights, road signs, other signs, and so on are arranged in three-dimensional space may be stored as the three-dimensional map information 34, or information necessary for representing a map in three dimensions (three-dimensional coordinate data of the contour of roads, the shape of buildings, road lines, traffic lights, road signs, and other signs) may be stored as the three-dimensional map information 34. In the case where information necessary for representing a map in three dimensions is stored, the navigation device 3 generates a map that represents a target area in three dimensions, using the information stored as the three-dimensional map information 34 as need arises.

The navigation device 3 provides common functions, such as displaying a map image on the liquid crystal display 17 and searching for a guide route, by using the two-dimensional map information 33. Whereas, the navigation device 3 performs processing for displaying a guide image (described below), by using the three-dimensional map information 34 in addition to the two-dimensional map information 33.

The navigation electronic control unit (ECU) 15 is an electronic control unit that controls the whole navigation device 3, and includes a CPU 41 serving as an arithmetic unit and a control unit, a RAM 42 that is used as a working memory when the CPU 41 performs various types of arithmetic processing and that stores route data and so on when a route is retrieved, a ROM 43 storing a travel support processing program (FIG. 3) (described below) and so on in addition to a control program, and an internal storage unit such as a flash memory 44 that stores a program read from the ROM 43. The navigation ECU 15 has various means serving as processing algorithms. For example, nearby object determining means determines whether there is a nearby object around a guide branch point on the guide route. Correcting means corrects a guide image, which indicates the travel direction of the vehicle that travels on the travel path after leaving a guide branch point, such that a portion overlapping a nearby object is set as a non-drawing region excluded from a drawing target. The displaying means displays the corrected guide image.

The operation unit 16 is operated when entering the departure point as the travel start point and the destination as the travel end point, and includes a plurality of operation switches (not illustrated) such as various keys and buttons. Then, the navigation ECU 15 performs control so as to execute various operations corresponding to switch signals that are output when the switches are pressed. The operation unit 16 may include a touch panel on the front surface of the liquid crystal display 17. Further, the operation unit 16 may include a microphone and a speech recognition device.

The liquid crystal display 17 displays a map image including roads, traffic information, operation guide, an operation menu, a description of keys, a guide route from the departure point to the destination, guide information according to the guide route, news, a weather report, and a TV program. It should be noted that in the first embodiment, since the HUD 4 is provided as the means for displaying information, the liquid crystal display 17 does not have to be provided in the case where the HUD 4 displays the map image and so on.

The speaker 18 outputs voice guidance for guiding travel according to the guide route based on an instruction from the navigation ECU 15, and a traffic information guidance.

The DVD drive 19 is a drive that can read data recorded on a recording storage such as a DVD and a CD. Then, music or video is played, or the map information database 31 is updated, based on the read data. A card slot for reading data from and writing data to a memory card may be provided in place of the DVD drive 19.

The communication module 20 is a communication device for receiving traffic information including congestion information, regulatory information, traffic accident information, that is transmitted from a traffic information center, such as a VICS center or a probe center. Examples of the communication module 20 include a mobile phone and a DCM.

Figure 3:
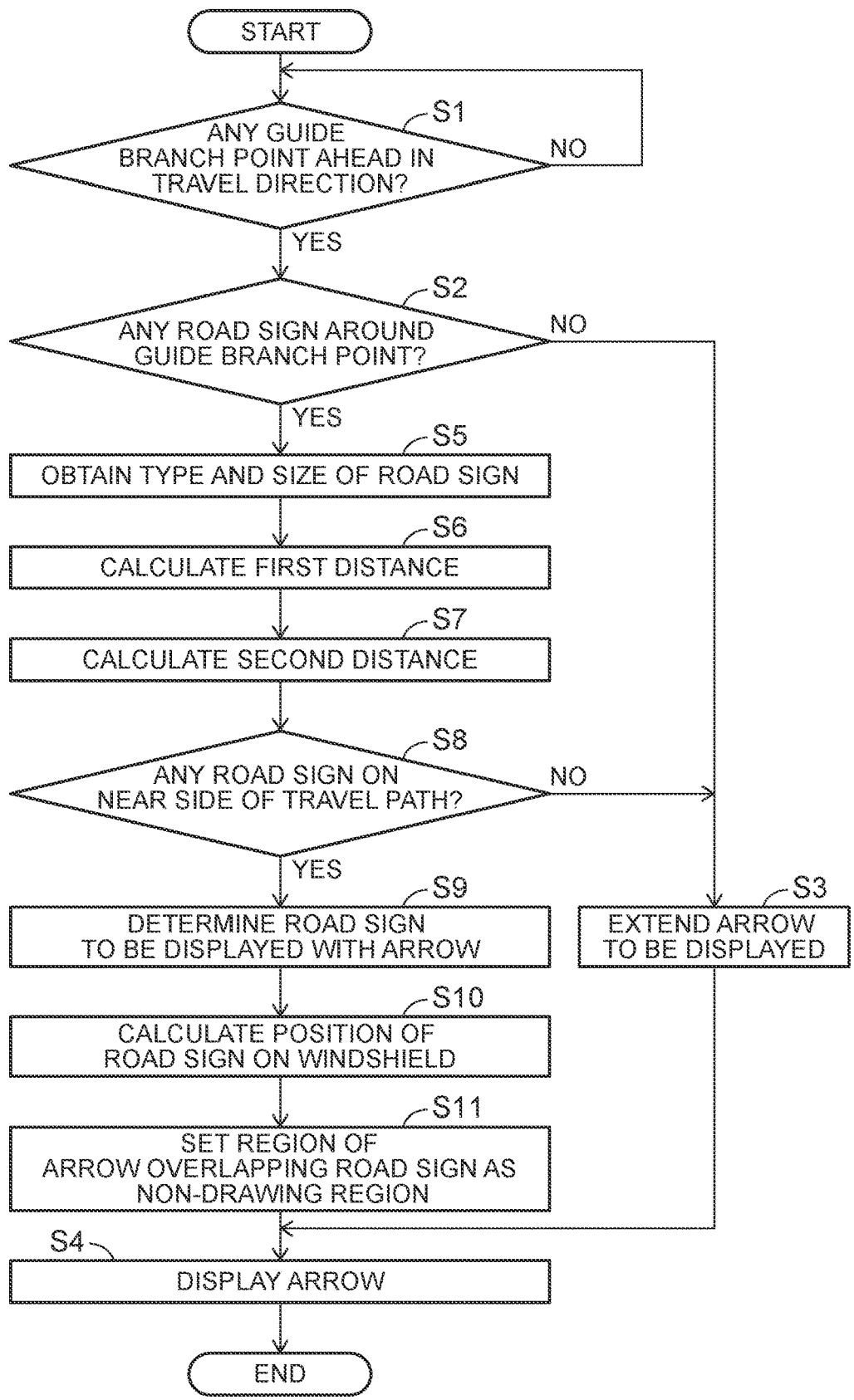
FIG. 3 is a flowchart of a travel support processing program according to the first embodiment.

In the following, a travel support processing program that is executed particularly on the navigation device 3 of the superimposed image display device 1 having the above configuration will be described with reference to FIG. 3. FIG. 3 is a flowchart of the travel support processing program according to the first embodiment. The travel support processing program is a program that is executed after an ACC power supply (accessory power supply) of the vehicle is turned ON, and provides guidance on the travel direction of the vehicle at a guide branch point to the occupant 9 of the vehicle 2, using the HUD 4. The program illustrated as the flowchart in FIG. 3 (described below) is stored in the RAM 42 or the ROM 43 of the navigation device 3, and is executed by the CPU 41.

The term "guide branch point" as used herein refers to a branch point where the travel direction of the vehicle needs to be indicated when providing travel guidance for the vehicle according to a guide route set in the navigation device 3, and includes intersections such as four-way intersections, T-intersections, and Y-intersections. The guide branch point is not limited to an intersection where two roads cross, and may include, for example, a branch point where a road splits into multiple roads.

According to the travel support processing program, first, in step (hereinafter abbreviated as "S") 1, the CPU 41 determines whether there is a guide branch point within a predetermined distance (for example, 700 m) ahead of the vehicle 2 in the travel direction. Specifically, the CPU 41 makes a determination based on the guide route currently set in the navigation device 3, the map information stored in the map information database 31, and the current position of the vehicle 2 detected by the current position detection unit 13. It should be noted that the guide route is determined by route search processing using the well-known Dijkstra's algorithm when the user sets a destination upon starting traveling, for example.

The means for determining whether there is a guide branch point within a predetermined distance ahead of the vehicle 2 in the travel direction in the above S1 is not limited to the means described above. For example, the CPU 41 may compare a captured image captured by the front camera 11 with the three-dimensional map information 34 to specify the current position of the vehicle in the three-dimensional map information 34, thereby determining whether there is a guide branch point ahead in the travel direction.

Then, if a determination is made that there is a guide branch point within the predetermined distance ahead of the vehicle 2 in the travel direction (S1: YES), the process goes to S2. In contrast, if a determination is made that there is no guide branch point within the predetermined distance ahead of the vehicle 2 (S1: NO), the process waits until a determination is made that there is a guide branch point. In this case, the CPU 41 repeats the operation of S1 at predetermined intervals, for example.

In S2, the CPU 41 determines whether there is a nearby objet, specifically a road sign, around the guide branch point ahead of the vehicle in the travel direction. The determination in the above S2 may be made by processing a captured image captured by the front camera 11, or may be made based on the current position of the vehicle and the three-dimensional map information 34. The three-dimensional map information 34 includes information that specifies the installation position of road signs in advance.

The "nearby objects" that are subjected to the determination in the above S2 may include artifacts such as guardrails, traffic mirrors, telephone poles, and buildings, and artifacts such as windbreaks, other than road signs. The nearby objects are not limited to stationary objects, and may include moving objects such as people. In the following, a road sign will be described as an example of the nearby object.

Then, if a determination is made that there is a road sign around the guide branch point ahead of the vehicle in the travel direction (S2: YES), the process goes to S5. In contrast, if a determination is made that there is no road sign around the guide branch point ahead of the vehicle in the travel direction (S2: NO), the process goes to S3.

In S3, the CPU 41 generates an image of an arrow that provides guidance about the travel direction of the vehicle that travels on the travel path especially after leaving the guide branch point, as an image to be displayed on the liquid crystal display 6 of the HUD 4. The shape of the image of the arrow that is generated is determined based on the travel direction of the vehicle and the shape of the guide branch point. The image displayed on the liquid crystal display 6 is superimposed as a virtual image 10 on the view ahead of the vehicle when visually recognized by the occupant of the vehicle (see FIG. 1).

Further, in the above S3, the CPU 41 corrects the generated image of the arrow. Specifically, the CPU 41 extends the head side of the arrow forward in the travel direction along the travel path to increase the overall length of the arrow.

After that, in S4, the CPU 41 transmits a control signal to the HUD 4 so as to display the image of the arrow generated and corrected in the above S3 on the liquid crystal display 6 of the HUD 4. As a result, particularly the virtual image 10 of the arrow as a guide image that provides guidance about the travel direction of the vehicle that travels on the travel path after leaving the guide branch point is superimposed on the view ahead of the vehicle when visually recognized by the occupant of the vehicle.

Figure 4:
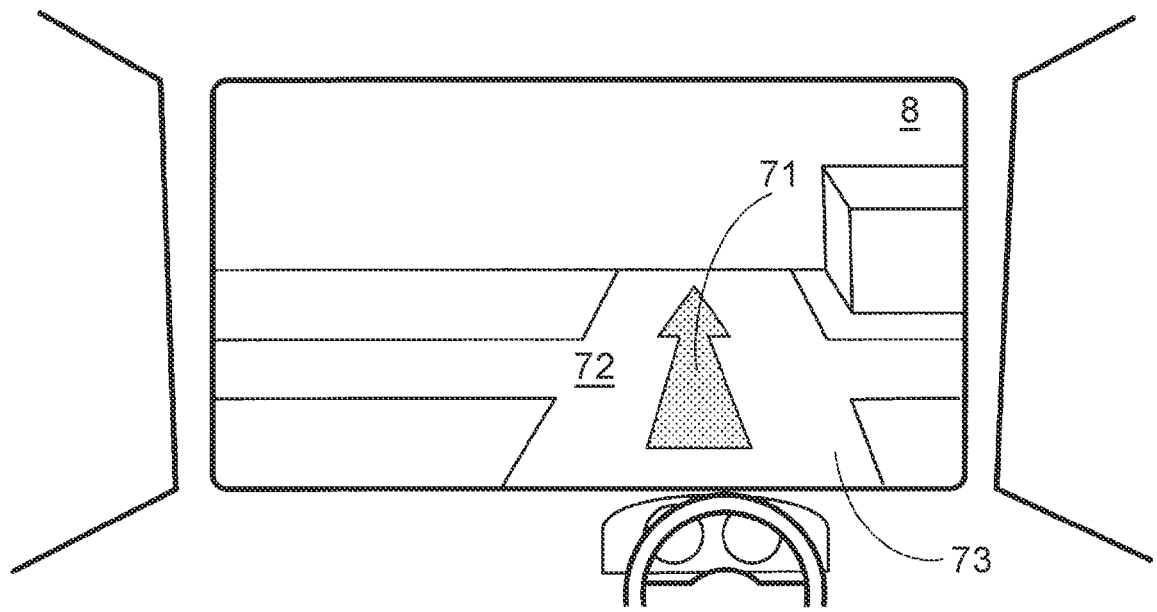
FIG. 4 illustrates a state in which an arrow indicating moving forward is displayed as a virtual image.

FIG. 4 illustrates a virtual image of an arrow visually recognized by an occupant of a vehicle especially in the case where the travel direction of the vehicle that travels on the travel path after leaving a guide branch point is the straight forward direction.

As illustrated in FIG. 4, an arrow 71 (arrow image) indicating moving forward is displayed as a virtual image through the windshield 8 of the vehicle, so as to be superimposed on the road surface of a driving path 73. Further, the virtual image of the arrow 71 extends forward in the travel direction along the driving path 73, through a guide branch point 72 representing a four-way intersection. The arrow 71 extends to, for example, the upper end of the displayable area of the HUD 4. Accordingly, when the occupant sees the virtual image of the arrow 71 illustrated in FIG. 4, the occupant can easily know that the route to take is to go straight through the guide branch point 72.

Figure 5:
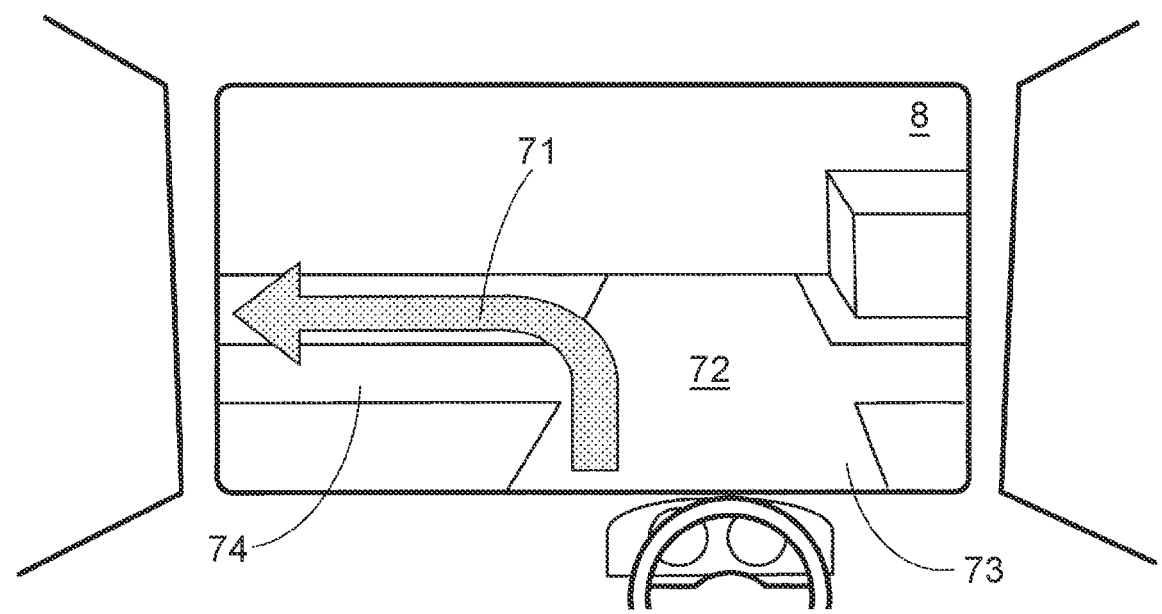
FIG. 5 illustrates a state in which an arrow indicating turning left is displayed as a virtual image.

FIG. 5 illustrates a virtual image of an arrow visually recognized by an occupant of a vehicle especially in the case where the travel direction of the vehicle that travels on the travel path after leaving a guide branch point is the leftward direction (that is, turning left).

As illustrated in FIG. 5, an arrow 71 (arrow image) indicating moving leftward is displayed as a virtual image through the windshield 8 of the vehicle, so as to be superimposed at the position upwardly spaced from the road surface while extending from the driving path 73 to the travel path 74 after turning left at the guide branch point 72. Further, the virtual image of the arrow 71 extends forward in the travel direction along the travel path 74 after turning left at the guide branch point 72. The arrow 71 extends to, for example, the left end of the displayable area of the HUD 4. Accordingly, when the occupant sees the virtual image of the arrow 71 illustrated in FIG. 5, the occupant can easily know that the route to take is to turn left at the guide branch point 72 into the travel path 74.

In S5, the CPU 41 obtains the type and size (the actual size, not the size in the captured image) of the road sign disposed around the guide branch point 72. Specifically, the CPU 41 performs image processing on the image of the road sign captured by the front camera 11, and determines the type and size of the road sign based on the features such as shape and design. For example, in Japan, the shape (size) and design of road signs are standardized by the Order on Road Sign, Road Line, and Road Surface Marking (Order on Sign). The map information database 31 stores information on the shape and design of each type of road sign standardized by Order of Sign in advance. The CPU 41 obtains the type and size of the road sign disposed around the guide branch point 72 by extracting data of the applicable road sign. The type and size of the road sign may be obtained using the three-dimensional map information 34. The three-dimensional map information 34 includes information that specifies the type and size of road signs, in addition to the installation position of road signs, in advance.

Then, in S6, the CPU 41 calculates a distance (hereinafter referred to as a "first distance") from the vehicle 2 to the road sign disposed around the guide branch point. In the following, the method of calculating the first distance in the above S6 will be described in detail.

Figure 6:
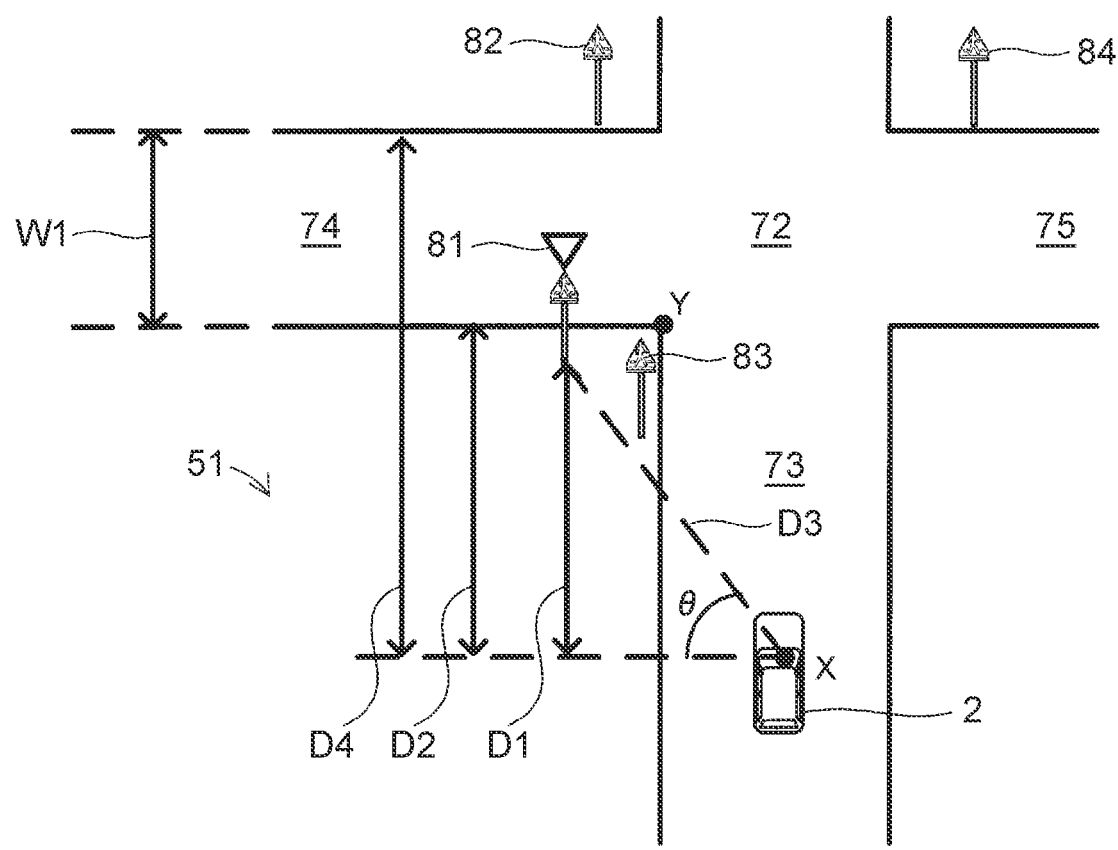
FIG. 6 illustrates the distance from the vehicle to a road sign disposed at a guide branch point.

FIG. 6 illustrates a first distance D1 from the vehicle 2 to a road sign 81 disposed around the guide branch point 72.

As illustrated in FIG. 6, in the first embodiment, the first distance D1 is the distance especially from a position X of the head of the occupant 9 of the vehicle 2 to the road sign 81. The in-vehicle camera 12 is disposed on the instrument panel of the vehicle 2 as described above or the ceiling, and is arranged to capture an image while facing the driver's seat. That is, the captured image contains the face of the occupant 9 sitting as a driver. Accordingly, the CPU 41 can detect the position X of the head of the occupant 9, based on the captured image of the in-vehicle camera 12.

Further, the CPU 41 calculates a linear distance between the front camera 11 and the road sign 81, by comparing the size of the road sign 81 obtained in the above S5 with the size of the road sign 81 in the captured image captured by the front camera 11. The greater the first distance D1 between the road sign 81 and the vehicle 2 is, the less the size of the road sign 81 in the image captured by the front camera 11 is. Accordingly, the CPU 41 can calculate the linear distance between the front camera 11 and the road sign 81, by comparing the size of the road sign 81 in the captured image with the actual size of the road sign 81. If the front camera 11 is a stereo camera, the linear distance between the front camera 11 and the road sign 81 can be directly calculated from the captured image. The CPU 41 adds a distance between the front camera 11 and the position X of the head of the occupant 9 to the calculated linear distance, thereby calculating a linear distance D3 between the position X of the head of the occupant 9 and the road sign 81.

Further, the CPU 41 calculates an angle θ between a line connecting the position X of the head of the occupant 9 and the road sign 81 and the width direction of the vehicle 2. Specifically, the CPU 41 first performs image processing on the captured image captured by the front camera 11 so as to specify the position of the road sign 81 in the captured image. After that, the CPU 41 calculates the angle θ, based on the specified position of the road sign 81, and the linear distance between the front camera 11 and the road sign 81. Then, the CPU 41 calculates the first distance D1 from the position X of the head of the occupant 9 to the road sign 81, based on the linear distance D3 and the angle θ.

In the above S6, the first distance D1 and the linear distance D3 may be calculated using a method other than the method described above. For example, the CPU 41 may calculate the linear distance D3 and the first distance D1, based on the position information of the road sign 81 included in the three-dimensional map information 34, and the current position of the vehicle 2 detected by the current position detection unit 13. Further, the CPU 41 may calculate the angle θ, based on a sight line of the occupant 9 detected by image processing on an image captured by the in-vehicle camera 12. Specifically, the CPU 41 first processes an image captured by the in-vehicle camera 12, thereby detecting a sight line start point (position of the eyes) and a sight line direction. Examples of the detection method of a sight line start point and a sight line direction include detection methods using the center position of the pupil calculated with a corneal reflection method and Purkinje images, for example. These methods are well known in the art, and therefore will not be described in detail herein. After that, when the sight line of the occupant 9 is focused on the presented travel path 74, the CPU 41 can calculate the angle θ based on the sight line, on the assumption that the occupant is looking at the road sign 81.

Further, in the above S6, if there are a plurality of road signs around the guide branch point 72, the CPU 41 calculates the first distance D1 for each of the road signs. However, the first distance D1 is not calculated for all the road signs, but is calculated only for the road signs disposed on the travel-path-74-side of the guide branch point 72. For example, in the example illustrated in FIG. 6, in the case of guiding the vehicle to turn left at the guide branch point 72 to take the travel path 74, the first distance D1 is calculated for the road signs 81 and 82 disposed on the travel-path-74-side of the guide branch point 72. The first distance D1 is also calculated for a road sign 83 disposed on a sidewalk on the left of the driving path 73. In contrast, the first distance D1 is not calculated for a road sign 84 on a travel-path-75-side on the right of the guide branch point 72 that is away from the guide route. However, the first distance D1 may be calculated for road signs (for example, the road sign 84 in FIG. 6) other than the road signs disposed on the travel-path-74 side of the guide branch point 72.

Then, in S7, the CPU 41 calculates a second distance D2, which is the distance from the vehicle 2 and a road end Y of the travel path 74 after leaving the guide branch point 72. It should be noted that the road end Y is specifically the guide-branch-point-72-side road end of the travel path 74 on the nearest side (vehicle side). Specifically, the CPU 41 first detects the position of the road end Y of the travel path 74, based on the map information. Then, the CPU 41 calculates the second distance D2, based on the position of the road end Y of the travel path 74, the current position of the vehicle 2, and the position X of the head of the occupant 9. Although the first distance D1 and the second distance D2 are calculated with reference to the position X of the head of the occupant 9, these distances may be calculated with reference to the position of the front camera 11 of the vehicle 2, the front end of the vehicle, the center of the vehicle, or the like.

Then, in S8, the CPU 41 determines whether there is a road sign disposed on the near side of the travel path 74 after leaving the guide branch point 72, based on the first distance D1 calculated in S6 and the second distance D2 calculated in S7. As illustrated in FIG. 6, the first distance D1 of the road sign 81 disposed on the near side of the travel path 74 is less than or equal to the second distance D2 of the road end Y of the travel path 74. In contrast, the first distance D1 of the road sign 82 disposed on the far side of the travel path 74 is greater than the second distance D2. Therefore, the CPU 41 can determine whether the road sign is disposed on the near side of the travel path 74, with reference to the second distance D2.

The CPU 41 may determine whether the road signs 81 and 82 are disposed on the near side or on the far side of the travel path 74, based on a distance D4 from the position X of the head of the occupant 9 to a road end on the far side of the travel path 74, and a road width W1 of the travel path 74 illustrated in FIG. 6, other than the first distance D1 and the second distance D2. For example, the CPU 41 can determine whether the road sign 82 is disposed on the near side of the travel path 74, by comparing a distance obtained by adding the road width W1 to the second distance D2 with the first distance D1 of the road sign 82. The CPU 41 can detect the road width W1 based on the map information.

Then, if a determination is made that there is a road sign on the near side of the travel path 74 after leaving the guide branch point 72 (S8: YES), the process goes to S9. In contrast, if a determination is made that there is no road sign on the near side of the travel path 74 after leaving the guide branch point 72 (S8: NO), the process goes to S3. After that, as described above, the CPU 41 generates an image of an arrow that provide guidance about the travel direction of the vehicle that travels on the travel path especially after leaving the guide branch point, as an image to be displayed on the liquid crystal display 6 of the HUD 4, and displays the image on the liquid crystal display 6. The head of the arrow is extended forward in the travel direction along the travel path.

In contrast, in S9, the CPU 41 determines the road sign (for instance, the road sign 81 in the example of FIG. 6 (hereinafter referred to as a "target road sign")) disposed on the near side of the travel path 74 after leaving the guide branch point 72, as a road sign to be displayed in association with the virtual image 10 of the arrow to be displayed as a guide image. In order to make it clear that the target road sign determined in the above S9 is disposed on the near side of the virtual image 10 of the arrow, the following processing is executed.

In S10, the CPU 41 calculates the position of the target road sign reflected on the windshield 8. More specifically, the CPU 41 calculates the position where the sight line of the occupant 9 to the target road sign and the windshield 8 cross each other when the occupant 9 sees the target road sign through the windshield 8.

Figure 7:
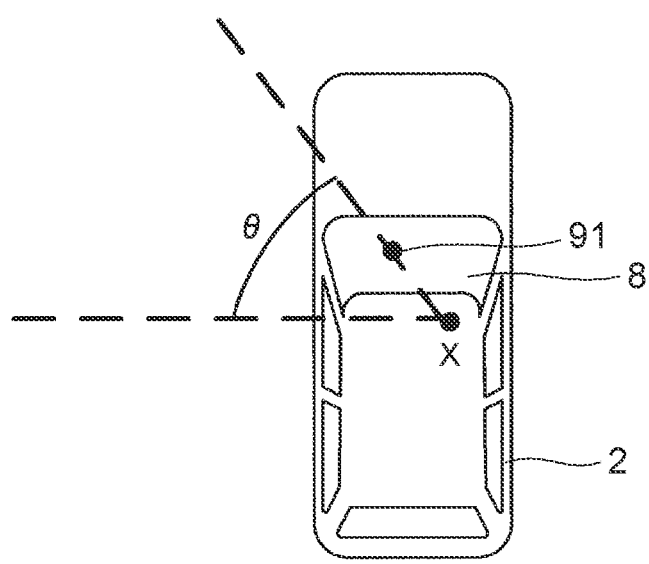
FIG. 7 illustrates the position of a road sign on a windshield.

FIG. 7 illustrates a position 91 of a road sign 81 on the windshield 8. It is assumed that the position 91 is, for example, the position of the vertical center of the road sign 81 as seen by the occupant 9.

First, the CPU 41 calculates the position 91 based on the angle θ, the position X of the head of the occupant, and the vehicle information. The position X of the head of the occupant is, for example, the position in the longitudinal direction, lateral direction, and vertical direction of the vehicle 2 (that is, the position in three-dimensional space). The vehicle information includes, for example, the size, position (distance from the driver's seat), and inclination angle of the windshield 8, and is stored in advance in the data recording unit 14. Then, the CPU 41 calculates, as the position 91 of the road sign 81 on the windshield 8, a position where the line extending in the horizontal direction, with an inclination of the angle θ with respect to the width direction of the vehicle at the position X of the head, crosses the windshield 8.

Then, in S11, the CPU 41 calculates a region where the virtual image of the arrow 71 serving as a guide image and the target road sign overlap when the occupant 9 sees the target road sign, and sets the overlapping region as a non-drawing region excluded from the drawing target. Specifically, in the above S11, the CPU 41 executes the following processing.

First, the CPU 41 calculates the size of the target road sign to be reflected on the windshield 8, based on the linear distance D3 connecting the position X of the head of the occupant and the target road sign. Then, the CPU 41 calculates the position and size of the target road sign that is reflected on the windshield 8 as seen from the occupant 9, based on the calculated size of the target road sign, and the position of the target road sign calculated in the above S10. Further, the CPU 41 calculates a region where the virtual image of the arrow 71 and the target road sign overlap when the occupant 9 sees the target road sign, based on the position and size of the target road sign, and the position and size of the arrow 71 to be displayed. Then, the CPU 41 sets the calculated region as a non-drawing region where the arrow 71 is not drawn. After that, when displaying the image of the arrow 71 on the liquid crystal display 6 of the HUD 4 as will be described below, the CPU 41 controls display such that the virtual image of the arrow 71 is not displayed in the set non-drawing region.

Then, in S4, the CPU 41 first generates an image of an arrow that provides guidance about the travel direction of the vehicle that travels on the travel path especially after leaving the guide branch point, as an image to be displayed on the liquid crystal display 6 of the HUD 4. The shape of the image of the arrow that is generated is determined based on the travel direction of the vehicle and the shape of the guide branch point. The image displayed on the liquid crystal display 6 is superimposed as the virtual image 10 on the view ahead of the vehicle when visually recognized by the occupant of the vehicle (see FIG. 1).

Further, in the above S4, the CPU 41 corrects the generated image such that a virtual image is not displayed on the non-drawing region set in the above S11 in the generated image of the arrow, by removing the corresponding region. After that, the CPU 41 transmits a control signal to the HUD 4 so as to display the generated and corrected image of the arrow on the liquid crystal display 6 of the HUD 4. As a result, a virtual image of the arrow in which the portion overlapping the target road sign is excluded from the drawing target is displayed.

Figure 8:
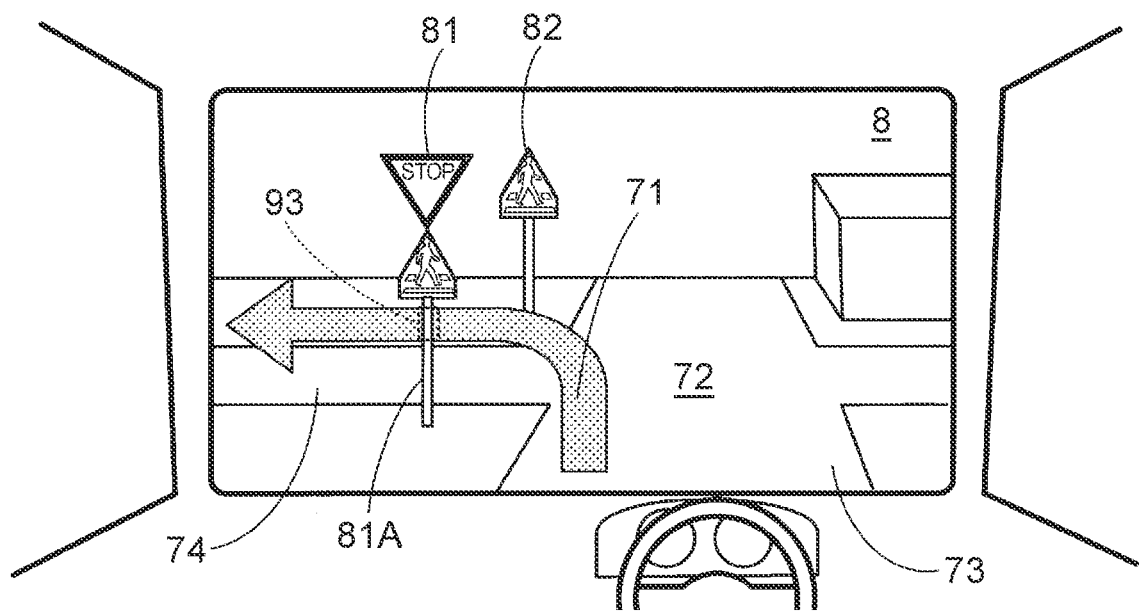
FIG. 8 illustrates a state in which an arrow having a non-drawing region overlapping a road sign is displayed as a virtual image.

FIG. 8 illustrates a virtual image of the arrow 71 in which the non-drawing region 93 is set, that is, which is corrected based on the non-drawing region 93. As illustrated in FIG. 8, the virtual image of the arrow 71 is corrected such that a portion overlapping a pole 81A of the road sign 81 is corrected (set) as the non-drawing region 93. Accordingly, the virtual image of the arrow 71 is displayed so as to extend on the far side (behind) the pole 81A of the road sign 81 disposed on the near side of the travel path 74 in the non-drawing region 93.

In contrast, a non-drawing region is not set for the road sign 82 on the far side of the travel path 74, and therefore the virtual image of the arrow 71 is displayed in a superimposed manner so as to extend on the near side of the road sign 82. This allows the occupant 9 to recognize the perspective relationship between the road signs 81 and 82 and the virtual image of the arrow 71, and hence accurately know the travel path 74 to take. The CPU 41 continues to display the virtual image of the arrow 71 until the vehicle passes through the guide branch point. Then, after the vehicle passes through the guide branch point, the CPU 41 finishes displaying the virtual image. After that, when the vehicle approaches the next guide branch point, the operations of S1 and the subsequent steps are executed again.

Figure 9:
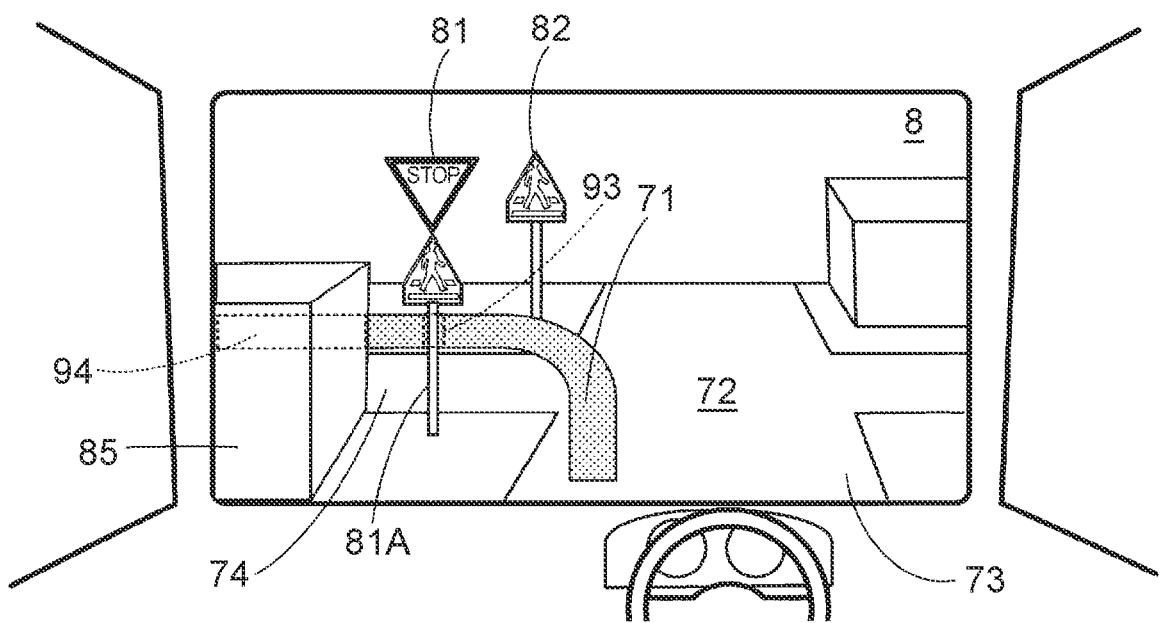
FIG. 9 illustrates a state in which an arrow having non-drawing regions overlapping a road sign and a building is displayed as a virtual image.

In the above example illustrated in FIG. 8, processing for setting a non-drawing region is performed on the road signs 81 and 82. However, the same processing may be performed on other nearby objects such as guardrails, traffic mirrors, buildings, and windbreaks. For example, as illustrated in FIG. 9, if there is a building 85 on the near side of the travel path 74, the CPU 41 may set a portion where the virtual image of the arrow 71 and the building 85 overlap as a non-drawing region 94. In the example illustrated in FIG. 9, the arrow 71 is displayed with its head extending behind the building 85. Accordingly, the occupant 9 can use the building 85 as a landmark to recognize the travel path 74 that passes behind the building 85, which suppresses making a wrong turn.

As described in detail above, according to the superimposed image display device 1 and the computer program executed by the superimposed image display device 1 of the first embodiment, the virtual image of the arrow 71 indicating the travel path after turning left at the guide branch point 72 is corrected such that a portion overlapping the road sign 81 around the guide branch point 72 is set as the non-drawing region 93. Further, the corrected virtual image of the arrow 71 is displayed such that the position of the non-drawing region 93 coincides with the position of the road sign 81. Accordingly, a part of the road sign 81 (pole 81A) is located on the near side of the corrected arrow 71 on the non-drawing region 93 when visually recognized. This allows the occupant 9 to recognize the perspective relationship between the position of the road sign 81 and the position of the corrected virtual image of the arrow 71, and hence accurately know the travel path 74 to take.

Second Embodiment

Next, a superimposed image display device according to a second embodiment will be described with reference to FIGS. 10 to 16. In the following description, the same reference numerals as those in the configuration of the superimposed image display device 1 of the first embodiment in FIGS. 1 to 9 denote the same or corresponding elements as those in the configuration of the superimposed image display device 1 of the first embodiment.

The general configuration of the superimposed image display device of the second embodiment is substantially the same as that of the superimposed image display device 1 of the first embodiment. Various control processes of the superimposed image display device of the second embodiment are also substantially the same as those of the superimposed image display device 1 of the first embodiment.

The superimposed image display device 1 of the first embodiment calculates a non-drawing region based on the positional relationship between a vehicle and a nearby object, and determines the shape of a guide image to be displayed based on the calculated non-drawing region. Meanwhile, the superimposed image display device of the second embodiment determines the shape of a guide image to be displayed by placing a model of the guide image on the three-dimensional map information 34. The superimposed image display device of the second embodiment is different from the superimposed image display device 1 of the first embodiment in this regard.

Figure 10:
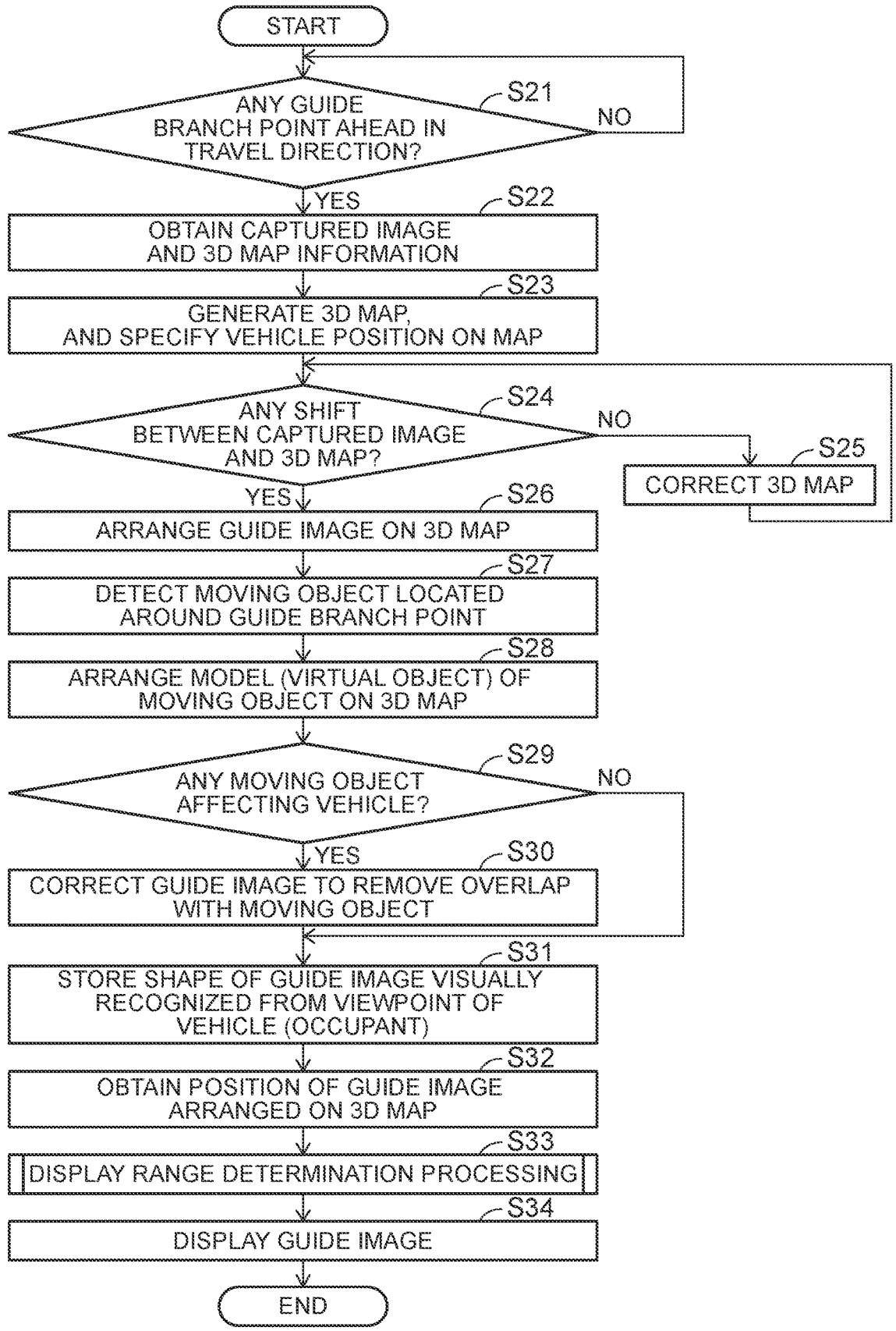
FIG. 10 is a flowchart of a travel support processing program according to a second embodiment.

Hereinafter, a travel support processing program that is executed in the superimposed image display device according to the second embodiment will be described with reference to FIG. 10. FIG. 10 is a flowchart of the travel support processing program according to the second embodiment.

First, in S21, the CPU 41 determines whether there is a guide branch point within a predetermined distance (for example, 700 m) ahead of the vehicle 2 in the travel direction. The details are the same as those of S1, and therefore will not be described herein.

Then, if a determination is made that there is a guide branch point within the predetermined distance ahead of the vehicle 2 in the travel direction (S21: YES), the process goes to S22. In contrast, if a determination is made that there is no guide branch point within the predetermined distance ahead of the vehicle 2 in the travel direction (S21: NO), the process waits until a determination is made that there is a guide branch point. In this case, the CPU 41 repeats the operation of S21 at predetermined intervals.

In S22, the CPU 41 obtains a captured image of a view ahead of the vehicle captured by the front camera 11. Further, the CPU 41 reads the three-dimensional map information 34 around the current position of the vehicle from the map information database 31. The three-dimensional map information 34 stores information necessary for representing a map in three dimensions (three-dimensional coordinate data such as the contour of roads, the shape of buildings, road lines, road signs, and other signs).

Then, in S23, the CPU 41 generates a three-dimensional map (map representing buildings, roads, and so on in three dimensions) around the guide branch point, based on the three-dimensional map information 34 read in the above S22. Specifically, the CPU 41 generates a three-dimensional map by executing the following processing.

First, the CPU 41 obtains objects (shape data) created by modeling roads, buildings, road signs, other signs, and so on in three-dimensional space from the three-dimensional map information 34. The CPU 41 may obtain an applicable object among objects that are modeled and stored in a database, or may newly create an object by performing modeling in S23. In the case of performing modeling, the CPU 41 obtains information specifying the shape and position of structures (such as buildings, road signs, and other signs) around a road or a guide branch point from the three-dimensional map information 34, and performs modeling based on the obtained information.

Modeling is processing for creating a shape of a model (object) in three-dimensional space. More specifically, modeling includes determining the coordinates of the vertices, and determining parameters of the equations representing boundaries and surfaces. Modeling is well known in the art, and therefore will not be described in detail herein. The modeled object (shape data) is represented in the form of a "wire-frame model" showing only the edges, a "surface model" showing only the surfaces, or the like, according to the intended use. Then, the three-dimensional space in which the objects are formed is used as a three-dimensional map.

In the above S23, the CPU 41 also specifies the current position and direction of the vehicle on the generated three-dimensional map, based on the parameters detected by the current position detection unit 13. In order to facilitate comparison processing between the three-dimensional map and the captured image (described below), it is preferable that especially the installation position of the front camera 11 installed on the vehicle be defined as the current position of the vehicle, and the optical axis direction of the front camera 11 be defined as the direction of the vehicle.

Figure 11:
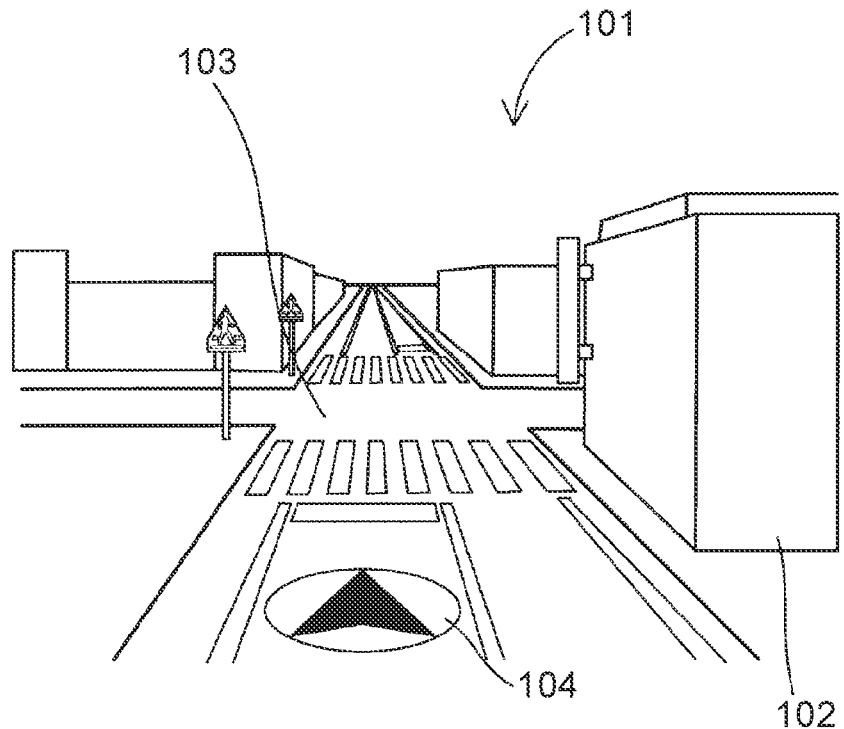
FIG. 11 illustrates a three-dimensional map generated based on three-dimensional map information.

FIG. 11 illustrates an example of a three-dimensional map 101 generated in the above S23. As illustrated in FIG. 11, the three-dimensional map 101 represents three-dimensional space in which objects 102 representing roads and structures (such as buildings, road signs, and other sings) are arranged. Especially, the objects 102 representing the roads and structures around the guide branch point 103 ahead of the vehicle in the travel direction are arranged. Further, a vehicle position mark 104 indicating the current position and direction of the vehicle is also arranged on the three-dimensional map 101.

Then, in S24, the CPU 41 compares the captured image obtained in the above S22 with the three-dimensional map generated in the above S23 so as to determine whether there is a shift between the two. Specifically, the CPU 41 sets the current position of the vehicle on the three-dimensional map (more specifically, the installation position of the front camera 11, with its height taken into account) as the viewpoint, sets the direction of the vehicle as the sight line direction, and compares an image of the three-dimensional map visually recognized from the set viewpoint in the set sight line direction with the captured image. It should be noted that the three-dimensional map does not contain moving objects such as pedestrians and other vehicles, and some stationary objects such as trees, and therefore a shift resulting from these objects are generally disregarded when making a determination. Further, it is preferable that the CPU 41 determine that there is no shift not only when the two images exactly coincide, but also when there is a little shift within an allowable range.

Then, if a determination is made that there is no shift between the captured image obtained in the above S22 and the three-dimensional map generated in the above S23 (S24: YES), the process goes to S26. In contrast, if a determination is made that there is a shift between the captured image obtained in the above S22 and the three-dimensional map generated in the above S23 (S24: NO), the process goes to S25.

In S25, the CPU 41 corrects the three-dimensional map generated in the above S23, by correcting the current position and direction of the vehicle set on the three-dimensional map so as to reduce the shift from the captured image obtained in above step S22. It should be noted that the CPU 41 may correct the objects while maintaining the current position and direction of the vehicle on the three-dimensional map fixed. As a result, the current position and direction of the vehicle on the three-dimensional map (more specifically, the installation position and the optical axis direction of the front camera 11) can be accurately specified. Then, the process returns to S24.

In contrast, in S26, the CPU 41 arranges a guide image that provides guidance at the guide branch point, on the three-dimensional map generated in the above S23. In the second embodiment, the guide image is an image of an arrow that provides guidance about the travel direction of the vehicle that travels on the travel path after leaving the intersection. The guide image is arranged so as to extend vertically upward at the position upwardly spaced by a predetermined distance (for example, 1 m) from the road surface of the travel path (for example, a road connected to the left side of the guide branch point in the case of turning left at the guide branch point) on which the vehicle travels after leaving the guide branch point.

Then, in S27, the CPU 41 detects a moving object (object in motion) around the guide branch point. The moving objects to be detected include, for example, pedestrians, bicycles, and vehicles, and are detected by performing image processing on the captured image captured by the front camera 11. The CPU 41 also specifies the position, type, shape, and the expected travel path (travel direction) of the detected moving object based on the captured image.

After that, in S28, the CPU 41 arranges a model (virtual object) of the moving object detected around the guide branch point, at the detected position on the three-dimensional map generated in the above S23. If a plurality of moving objects are detected, the CPU 41 arranges all the detected moving objects on the three-dimensional map. The virtual object arranged on the three-dimensional map has the shape resembling the actual shape of the moving object. For example, if the moving object is a pedestrian, the virtual object has a human shape, and if the moving object is a vehicle, the virtual object has the shape of a vehicle. Also, the virtual object has the size corresponding to the actual size of the moving object. However, if the moving object has an indeterminate shape (the shape and type cannot be determined), the virtual object is formed in the shape of the smallest cuboid that contains the entire moving object.

Figure 12:
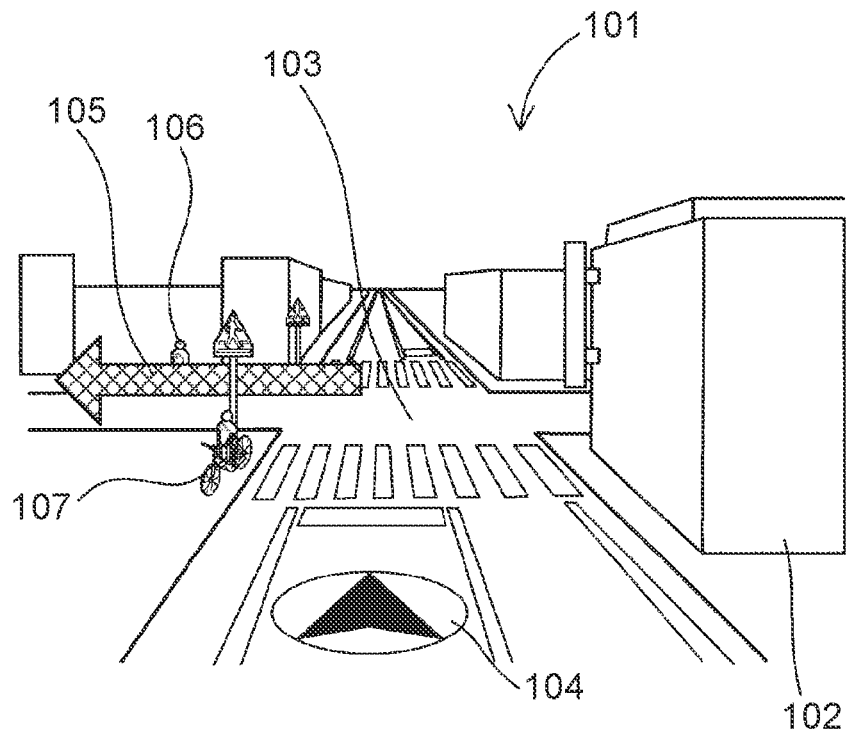
FIG. 12 illustrates a three-dimensional map with a guide image and moving objects arranged thereon.

FIG. 12 illustrates the three-dimensional map 101 with a guide image 105 and virtual objects 106 and 107 of moving objects arranged thereon. In the example illustrated in FIG. 12, the virtual object 106 represents a pedestrian, and the virtual object 106 represents a bicycle. That is, a pedestrian and a bicycle are present as moving objects around the guide branch point 103.

Then, in S29, the CPU 41 determines whether there is a "moving object that affects traveling of the vehicle when the vehicle travels along the travel path", among the moving objects whose virtual objects are arranged on the three-dimensional map. Specifically, the CPU 41 determines a moving object whose expected travel path and the travel path of the vehicle overlap as a "moving object that affects traveling of the vehicle when the vehicle travels along the travel path".

Figure 13:
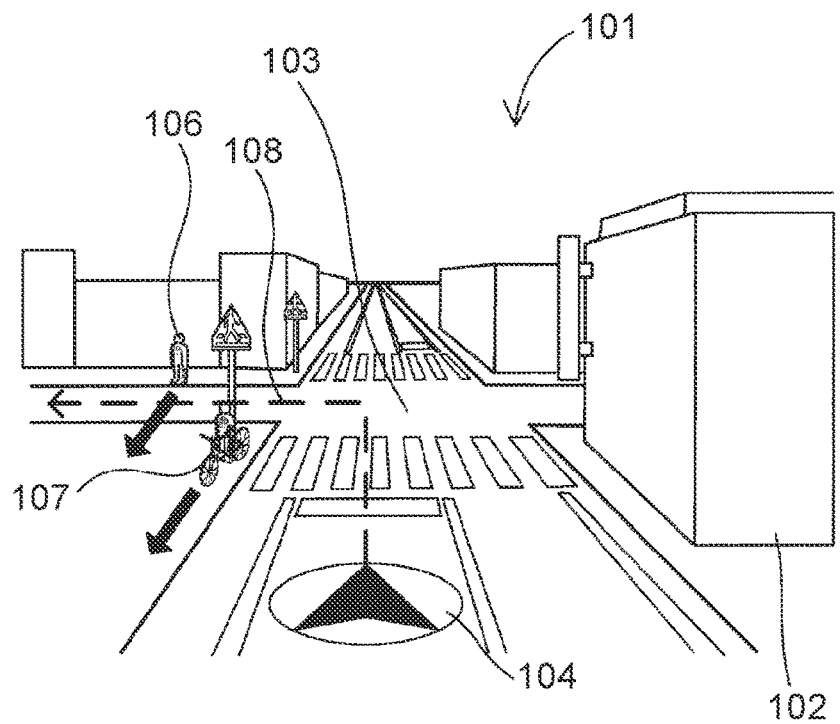
FIG. 13 illustrates moving objects that affect traveling of a vehicle when the vehicle travels along a travel path.
Figure 14:
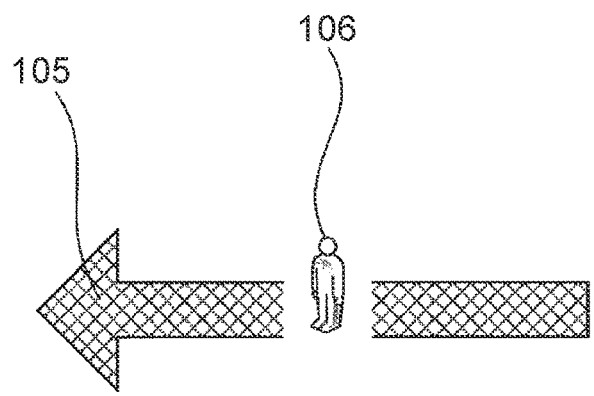
FIG. 14 illustrates an example in which a guide image is corrected such that a virtual image is not displayed in the region overlapping an affecting moving object.

For example, as illustrated in FIG. 13, if the travel path (travel direction) of the pedestrian modeled as the virtual object 106 is a travel path crossing a road connected to the left side of the guide branch point, the expected travel path of the pedestrian and a travel path 108 of the vehicle overlap. Accordingly, the pedestrian modeled as the virtual object 106 is determined to be a "moving object that affects traveling of the vehicle when the vehicle travels along the travel path". Meanwhile, the travel path (travel direction) of the bicycle modeled as the virtual object 107 is a travel path extending away from the guide branch point 103 without crossing the road connected to the left side of the guide branch point, and therefore the expected travel path of the bicycle and the travel path 108 of the vehicle do not overlap. Accordingly, the bicycle modeled as the virtual object 107 is determined not to be a "moving object that affects traveling of the vehicle when the vehicle travels along the travel path".

Then, if the CPU 41 determines that there is a "moving object that affects traveling of the vehicle when the vehicle travels along the travel path", among the moving objects whose virtual objects are arranged on the three-dimensional map (S29: YES), the process goes to S30. In contrast, if the CPU 41 determines that there is no "moving object that affects traveling of the vehicle when the vehicle travels along the travel path", among the moving objects whose virtual objects are arranged on the three-dimensional map (S29: NO), the process goes to S31.

In S30, the CPU 41 corrects the guide image arranged on the three-dimensional map such that the guide image is displayed without overlapping the moving object that affects traveling of the vehicle when the vehicle travels along the travel path (hereinafter referred to as an "affecting moving object"). Specifically, the CPU 41 first obtains an image of the three-dimensional map, with the moving objects and the guide image arranged thereon, that is visually recognized in the travel direction of the vehicle from the viewpoint of the vehicle (occupant) (hereinafter referred to as a "visually-recognized image"). Especially, the viewpoint of the vehicle is set to the viewpoint of the occupant of the vehicle. The position of the eyes of the occupant can be detected by the in-vehicle camera 12. The position of the eyes of the occupant on the three-dimensional map is specified by combining the current position and direction of the vehicle, which are finally specified as a result of comparison between the captured image and the three-dimensional map in the above S24, and the detection result of the in-vehicle camera 12. The visually-recognized image is an image that can be visually recognized when the objects (such as roads, buildings, road signs, other signs, virtual objects of moving objects, and guide images) arranged on the three-dimensional map are visually recognized in the travel direction of the vehicle from the viewpoint of the vehicle (occupant). The visually-recognized image corresponds to the field of view of the occupant of the vehicle. It should be noted that the visually-recognized image does not have to be an image visually recognized in the travel direction of the vehicle as long as the visually-recognized image is an image visually recognized from the viewpoint of the vehicle (occupant). However, the visually-recognized image needs to include at least the guide image. Then, if the virtual object 106 of the affecting moving object and the guide image overlap as illustrated in FIG. 12 in the visually-recognized image obtained as described above, either one of the following corrections (1) and (2) is made.

Figure 15:
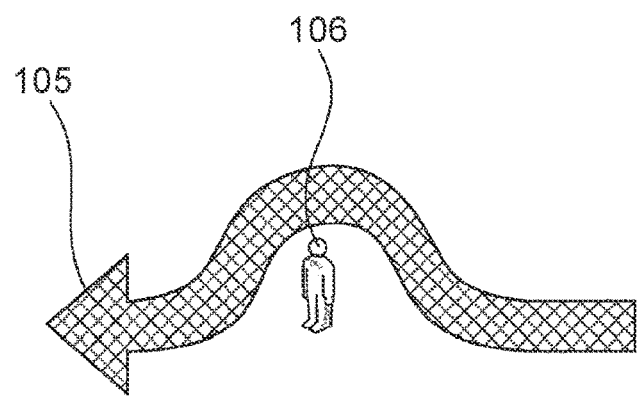
FIG. 15 illustrates another example in which a guide image is corrected such that a virtual image is not displayed in the region overlapping an affecting moving object.

(1) To prevent the virtual image from being displayed in the region overlapping the affecting moving object, the guide image arranged on the three-dimensional map is corrected such that the region overlapping the virtual object of the moving object is removed from the guide image. For example, as illustrated in FIG. 15, the arrow is corrected such that the region where the guide image 105 and the virtual object 106 of the affecting moving object overlap in the visually-recognized image is removed. If the arrow overlaps the virtual object 106 of the affecting moving object especially at its head, the head of the arrow is made longer or shorter such that the head of the arrow is displayed.

Figure 16:
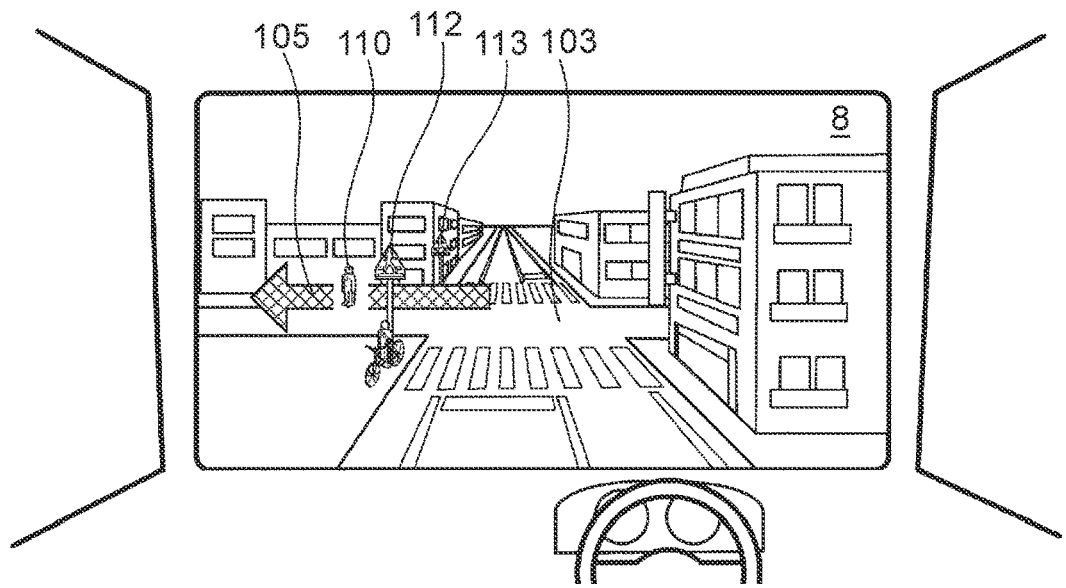
FIG. 16 illustrates an example of a virtual image of a guide image visually recognized by an occupant of the vehicle.

(2) To prevent the virtual image from being displayed in the region overlapping the affecting moving object, the guide image arranged on the three-dimensional map is corrected to have a shape that goes around the virtual object of the affecting moving object. For example, as illustrated in FIG. 16, the arrow is curved such that the guide image 105 does not overlap the virtual object 106 of the affecting moving object in the visually-recognized image.

In the second embodiment, the processing in the above S30 is performed only on the affecting objects located especially on the far side of the travel path of the vehicle (that is, the far side of the guide image 105). This is because, as for the affecting objects located on the near side of the travel path of the vehicle (that is, the near side of the guide image 105), even if the correction in S30 is not performed, portions overlapping the affecting objects are removed from the guide image when determining the shape of the guide image in S31 (described below).

Then, in S31, the CPU 41 stores the shape of the guide image contained in the visually-recognized image (the corrected shape if correction in the above S30 is made), as the shape of the guide image to be displayed by the HUD 4. The shape of the guide image contained in the visually-recognized image is the shape of the guide image that can be visually recognized when the objects (such as roads, buildings, road signs, other signs, virtual objects of moving objects, and guide images) arranged on the three-dimensional map are visually recognized from the viewpoint of the vehicle (occupant). If the guide image overlaps the objects (such as road signs, buildings, and the virtual object of the moving object arranged in the above S28) located on the near side of the travel path when visually recognized, the shape of the guide image that is stored in the above S31 does not contain the overlapping portions. For example, if the guide image has the shape of an arrow, the shape of the arrow that is stored does not contain the portions overlapping the objects when visually recognized. However, if the arrow overlaps an object especially at its head, the head of the arrow is made longer or shorter so as to prevent the head of the arrow from overlapping the object, so that the shape of the arrow that is stored contains at least its head. In contrast, if the guide image overlaps the objects located on the far side of the travel path when visually recognized, the shape that is stored contains the overlapping portions.

Further, in S32, the CPU 41 obtains the position of the guide image arranged on the three-dimensional map. Specifically, the position of the guide image is the position upwardly spaced by a predetermined distance (for example, 1 m) from the road surface of the travel path on which the vehicle travels after leaving the guide branch point.

After that, in S33, the CPU 41 performs display range determination processing (described below). In the display range determination processing, the range for displaying the guide image in the HUD 4 (the range for projecting the guide image on the windshield 8, or the range for displaying the guide image on the liquid crystal display 6 of the HUD 4) is determined.

Subsequently, in S34, the CPU 41 transmits a control signal to the HUD 4 so as to display the guide image with the shape stored in the above S21 on the liquid crystal display 6 of the HUD 4, in the display range determined in the above S33. As a result, particularly the virtual image of the arrow as a guide image that provides guidance about the travel direction of the vehicle that travels on the travel path after leaving the guide branch point is visually recognized by the occupant of the vehicle as being superimposed on the view ahead of the vehicle.

FIG. 16 illustrates a virtual image of a guide image visually recognized by an occupant of a vehicle especially in the case where the travel direction of the vehicle that travels on the travel path after leaving a guide branch point is the leftward direction (that is, turning left).

As illustrated in FIG. 16, a guide image 105 representing an arrow indicating moving leftward is displayed as a virtual image through the windshield 8 of the vehicle, so as to be superimposed at the position upwardly spaced from the road surface of the travel path after turning left at the guide branch point 103. The virtual image of the guide image 105 is displayed in a manner such that a region overlapping a nearby object located on the near side of the travel path, namely, a road sign 112, is removed. Accordingly, the guide image 105 extends on the far side of (behind) the road sign 112 when visually recognized. In contrast, the guide image 105 is displayed over a road sign 113 disposed on the far side of the travel path. Accordingly, the guide image 105 extends on the near side of the road sign 113 when visually recognized. This allows the occupant 9 to recognize the perspective relationship between the position of the road signs 112 and 113 and the position of the virtual image of the guide image 105, and hence accurately know the travel path to take. Although FIG. 16 illustrates particularly an example in which a nearby object overlapping the virtual image of the guide image 105 is a road sign, the guide image 105 is displayed in the same manner even when a nearby object is a building or a moving object (a pedestrian or another vehicle).

Further, if there is an affecting moving object 110 around the guide branch point 103 as described above, the guide image 105 is corrected such that a region overlapping the affecting moving object 110 is removed or to have a shape that goes around the affecting moving object 110, so as not to display the virtual image in the overlapping region. This allows the occupant 9 to reliably visually recognize the affecting moving object 110, while preventing the guide image 105 from interfering with visibility of the affecting moving object 110.

Figure 17:
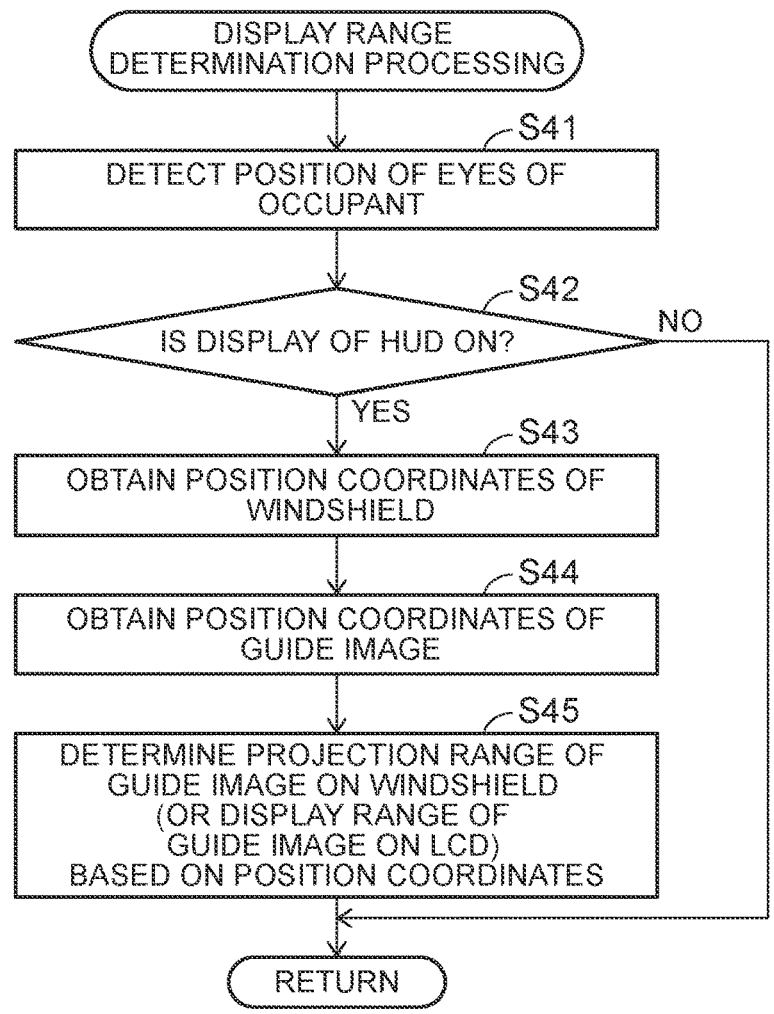
FIG. 17 is a flowchart of a sub-processing program of display range determination processing.

In the following, sub-processing of display range determination processing executed in the above S33 will be described with reference to FIG. 17. FIG. 17 is a flowchart of a sub-processing program of display range determination processing.

First, in S41, the CPU 41 detects the position of eyes of the occupant of the vehicle, based on the captured image captured by the in-vehicle camera 12. The detected position of the eyes is specified by the three-dimensional position coordinates.

Then, in S42, the CPU 41 determines whether the display of the HUD 4 is ON. The ON/OFF of the display of the HUD 4 can be switched by the occupant of the vehicle. The ON/OFF may also be switched automatically based on the surrounding circumstances and vehicle conditions.

Then, if the display of the HUD 4 is determined to be ON (S42: YES), the process goes to S43. In contrast, if the display of the HUD 4 is determined to be OFF (S42: NO), the process ends without causing the HUD 4 to display a virtual image of the guide image.

In S43, the CPU 41 obtains the position coordinates of the windshield 8 on which an image is projected by the HUD 4. The position coordinates of the windshield 8 are specified by the three-dimensional position coordinates.

Then, in S44, the CPU 41 obtains, as the coordinates of the guide image, the coordinates that specify the position of the guide image arranged on the three-dimensional map obtained in the above S32. The position coordinates of the guide image are also specified by the three-dimensional position coordinates.

Subsequently, in S45, the CPU 41 determines a projection range of the guide image on the windshield 8, based on the respective sets of position coordinates obtained in the above S41, S43, and S44. The CPU 41 also determines a display range of the guide image on the liquid crystal display 6 in the HUD 4, based on the determined projection range. Then, the process goes to S34, in which a virtual image is displayed using the HUD 4, based on the determined projection range and the display range. The operations of S31 to S34 are repeated until the display of the HUD is turned OFF.

As described in detail above, according to the superimposed image display device and the computer program executed by the superimposed image display device of the second embodiment, in the case of displaying a guide image that provide guidance about a travel direction of a vehicle that travels on a travel path after leaving a guide branch point so as to be visually recognized such that the guide image is superimposed on a view ahead of the vehicle, the guide image is displayed in a manner such that a region overlapping a nearby object present on the near side of the travel path on which the vehicle travels is removed from the guide image (S31 to S34). This allows the occupant of the vehicle to clearly recognize the perspective relationship between the position of the nearby object (for example, building, pedestrian, vehicle, and roadside tree) included in the real view and the position of the guide image. Accordingly, it is possible to accurately inform the vehicle occupant of the travel path to take.

It should be understood that the above embodiments are exemplary, and various improvements and modifications may be made without departing from the scope of the inventive principles.

Figure 18:
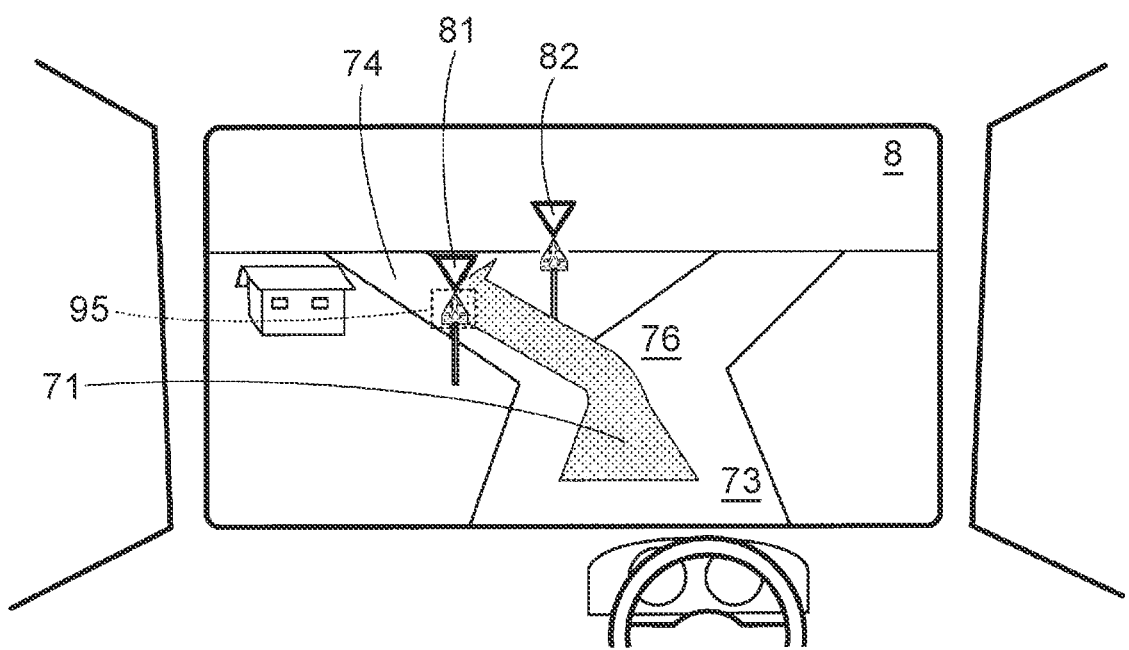
FIG. 18 illustrates a modification.

For example, in the first and second embodiments, the guide branch point 72 representing a four-way intersection is described as an example of the guide branch point. However, the guide branch point is not limited thereto. For example, as illustrated in FIG. 18, the guide branch point may be a branch point 76 where the driving path 73 splits into two paths. In this case, as illustrated in FIG. 18, a virtual image of the arrow 71 is, for example, extended diagonally left forward along the travel path 74 after leaving the branch point 76. In the arrow 71, a portion overlapping the road sign 81 on the near side of the travel path 74 is set as a non-drawing region 95. The arrow 71 is displayed in a superimposed manner on the near side of the road sign 82 present on the far side of the travel path 74. Even in this case, as in the above embodiments, the occupant 9 can accurately know the travel path 74 to take.

In the above embodiments, although not particularly mentioned, the principles are applicable not only to the case of left-side driving, but also to the case of right-side driving.

In the first and second embodiments, the HUD 4 generates a virtual image ahead of the windshield 8 of the vehicle 2. However, a virtual image may be generated ahead of a window other than the windshield 8. Further, an image may be reflected on a visor (combiner) installed around the windshield 8, instead of being reflected on the windshield 8 by the HUD 4.

In the first and second embodiments, although the HUD 4 is used as the means for displaying an image to be superimposed on the surrounding environment, a windshield display (WSD) that displays an image on the windshield 8 may be used. Alternatively, a display device that superimposes a guide image on the real view displayed on the liquid crystal display 17 of the navigation device 3 may be used.

In the first and second embodiments, the processing of the travel support processing program (FIGS. 3 and 10) is executed by the navigation ECU 15 of the navigation device 3. However, the component that executes the processing may be appropriately changed. For example, a control unit of the HUD 4, a vehicle control ECU, or other in-vehicle devices may execute the processing. In the case where the control unit of the HUD 4 executes the processing, the display device according may include only the HUD 4.

Although the embodiments of the display device have been described above, the display device may have the following configurations. In that case, the following effects are achieved.

For example, a first configuration is as follows.

A display device (1) is mounted on a vehicle (2) and displays a guide image (71, 105) so as to be visually recognized such that the guide image is superimposed on a view ahead of the vehicle, the guide image providing guidance about a travel direction of the vehicle that travels on a travel path (74, 108) after leaving a guide branch point (72, 103). The display device includes: guide image displaying means (41) for displaying the guide image in a manner such that a region overlapping a nearby object (81, 112) present on a near side of the travel path on which the vehicle travels is removed from the guide image.

According to the display device having the above configuration, in the guide image that provides guidance about the travel direction after leaving the guide branch point, the region overlapping the nearby object present on the near side of the travel path on which the vehicle travels is excluded from a superimposition target. This allows the occupant of the vehicle to clearly recognize the perspective relationship between the position of the nearby object (for example, building, pedestrian, vehicle, and roadside tree) included in the real view and the position of the guide image. Accordingly, it is possible to accurately inform the vehicle occupant of the travel path to take.

A second configuration is as follows.

The display device further includes: nearby object determining means (41) for determining whether there is the nearby object (81, 112) present on the near side of the travel path (74, 108) on which the vehicle (2) travels; and correcting means (41) for correcting the guide image such that the portion overlapping the nearby object is set as a non-drawing region (93 to 96) excluded from a drawing target when there is the nearby object (81, 112) present on the near side of the travel path on which the vehicle travels; wherein the displaying means (41) displays the corrected guide image.

According to the display device having the above configuration, the guide image that indicates the travel direction after leaving the guide branch point is corrected such that a portion overlapping the nearby object around the guide branch point is set as a non-drawing region. The corrected guide image is displayed such that the position of the non-drawing region coincides with the position of the nearby object. A part of the nearby object is displayed on the near side (over) the corrected guide image in a superimposed manner, in the non-drawing region. This allows the user to know the perspective relationship between the position of an object (nearby object) in the real view and the position of the corrected guide image, and to know the travel path to take.

A third configuration is as follows.

The nearby object determining means (41) determines whether there is the nearby object (81, 112) present on the near side of the travel path (74, 108) on which the vehicle (2) travels after turning at the guide branch point (72, 103).

According to the display device having the above configuration, the guide image is corrected such that a portion overlapping the nearby object present on the near side of the travel path on which the vehicle travels after turning the guide branch point is set as a non-drawing region. Accordingly, the nearby object on the near side of the travel path after turning is displayed on the near side of the guide image, so that the user can more reliably recognize the position to turn and the travel path after turning.

A fourth configuration is as follows.

The guide image displaying means (41) superimposes the guide image (71, 105) on a view seen through a windshield (25) of the vehicle (2). The display device further includes: angle obtaining means (41) for obtaining an angle (θ) between a line (D3) connecting the vehicle (2) and the nearby object (81, 112) and a width direction of the vehicle; and position obtaining means (41) for obtaining a position (91) on the windshield at which the nearby object is visually recognized by an occupant (26) of the vehicle, based on the angle obtained by the angle obtaining means. The correcting means (41) determines a position of the non-drawing region (93 to 96), based on the position obtained by the position obtaining means.

According to the display device having the above configuration, the angle obtaining means obtains an angle between a line connecting the vehicle and the nearby object and a width direction of the vehicle. The position obtaining means detects a position on the windshield at which the nearby object is visually recognized by an occupant, based on the angle. The correcting means determines a position of the non-drawing region, based on the position detected by the position obtaining means. Accordingly, the display device, such as an HUD and a windshield display device, that superimposes a guide image on the real view seen through the windshield can more accurately adjust the position of a non-drawing region to the position of the nearby object.

A fifth configuration is as follows.

The display device further includes: first distance obtaining means (41) for obtaining a first distance (D1) from the vehicle (2) to the nearby object, based on a size of the nearby object (81, 112); and second distance obtaining means (41) for obtaining a second distance (D2) from the vehicle (2) to a road end (74A) on a near side of the travel path (74); wherein the nearby object determining means (41) determines whether there is the nearby object, based on a determination that the first distance is less than or equal to the second distance.

For example, the size of road signs (nearby objects) is prescribed by regulations or the like. Therefore, the first distance from the vehicle to the nearby object can be obtained based on the prescribed size of the road sign and the size of the road sign in the captured image. Accordingly, the display device can more accurately determine whether the nearby object is present on the near side or on the far side of the travel path, based on the first distance and the second distance from the vehicle to the near side of the travel path.

A sixth configuration is as follows.

The guide image (71, 105) is an image representing an arrow, and the correcting means (41) extends a head side of the arrow of the guide image forward in the travel direction along the travel path (74, 108).

According to the display device having the above configuration, the arrow of the guide image is extended forward in the travel direction on the travel path. This allows the user to easily know the travel direction after going straight through or turning left at the guide branch point.

A seventh configuration is as follows.

The guide image displaying means (41) displays the guide image (71, 105) in a superimposed manner on a near side of a far-side nearby object (82, 113) present on a far side of the travel path (74, 108) on which the vehicle travels.

According to the display device having the above configuration, the corrected guide image is displayed in a superimposed manner on the near side of a nearby object on the far side of the travel path. For example, a nearby object on the near side of the travel path is displayed on the near side of the guide image, and a nearby object on the far side of the travel path is displayed on the far side of the guide image. This allows the user to more accurately recognize the perspective relationship between the nearby object and the guide image.

An eighth configuration is as follows.

The guide image displaying means (41) displays the guide image (71, 105) as a virtual image.

According to the display device having the above configuration, a virtual image that provide guidance about the travel direction is superimposed on the real view such that the user can see the virtual image together with the travel path. Thus, the user can more accurately know at which intersection the user needs to turn, by confirming the positional relationship between the virtual image (guide image) superimposed on the real view seen through the windshield and the nearby object, for example.

A ninth configuration is as follows.

The guide image (71, 105) is displayed at such a position that the guide image is spaced upwardly from a road surface when visually recognized.

According to the display device having the above configuration, the guide image can be clearly visually recognized by the occupant of the vehicle as the guide image is not blended into the view such as the road surface but is distinguishable from the view, while preventing the guide image from being blended into the view.

A tenth configuration is as follows.

The guide image (71, 105) is an image of an arrow indicating the travel direction of the vehicle that travels on the travel path (74, 108) after leaving the guide branch point (72, 103), and the guide image displaying means (41) displays a head of the arrow in a region not overlapping the nearby object (81, 112).

According to the display device having the above configuration, even if the guide image and the nearby object overlap, at least the head of the arrow can be displayed. Therefore, the occupant can know the travel direction indicated by the guide image.

An eleventh configuration is as follows.

The display device further includes: captured image obtaining means (41) for obtaining a captured image of the view ahead of the vehicle (2); map information obtaining means (41) for obtaining three-dimensional map information (34); comparing means (41) for comparing the captured image with the three-dimensional map information; image arranging means (41) for arranging the guide image (71, 105) on the travel path on which the vehicle travels after leaving the guide branch point in the three-dimensional map information, based on a result of comparison by the comparing means; and shape obtaining means (41) for obtaining a shape of the guide image that is visually recognized from a position of the vehicle in the three-dimensional map information; wherein the guide image displaying means displays the guide image having the shape obtained by the shape obtaining means.

According to the display device having the above configuration, it is possible to easily generate the guide image in which the region overlapping the nearby object present on the near side of the travel path on which the vehicle travels is excluded from a superimposition target, using the captured image of the view ahead of the vehicle and the three-dimensional map information.

A twelfth configuration is as follows.

The nearby object (81, 112) is at least one of a building, a road sign, and a moving object According to the display device having the above configuration, in the guide image that provide guidance about the travel direction after leaving the guide branch point, the region overlapping the object, such as buildings, road signs, and moving objects, that is present on the near side of the travel path on which the vehicle travels is excluded from a superimposition target. This allows the occupant of the vehicle to clearly recognize the perspective relationship between the position of the object, such as buildings, road signs, and moving objects, included in the real view and the position of the guide image. Accordingly, it is possible to accurately inform the vehicle occupant of the travel path to take.

The invention claimed is:

1. A display device that is mounted on a vehicle and displays a guide image so as to be visually recognized such that the guide image is superimposed on a view ahead of the vehicle, the guide image providing guidance about a travel direction of the vehicle that travels on a travel path after leaving a guide branch point, the display device comprising:
a processor programmed to:
obtain a captured image of the view ahead of the vehicle;
obtain three-dimensional map information from a server;
generate a three-dimensional map based on the obtained three-dimensional map information;
compare the captured image with the generated three-dimensional map;
based on the comparison, correct any shift between the captured image and the generated three-dimensional map to create a corrected three-dimensional map;
arrange the guide image on the travel path on which the vehicle travels after leaving the guide branch point in the three-dimensional map, based on a result of the comparison;
obtain a shape of the guide image that is visually recognized from a position of the vehicle in the corrected three-dimensional map;
obtain a first distance from the vehicle to a nearby object, based on a size of the nearby object;
obtain a second distance from the vehicle to a road end on a near side of the travel path;
determine whether there is the nearby object present on the near side of the travel path on which the vehicle travels based on a determination that the first distance is less than or equal to the second distance;
correct the guide image such that a region overlapping the nearby object is set as a non-drawing region excluded from a drawing target when there is the nearby object present on the near side of the travel path on which the vehicle travels; and
display the guide image having the obtained shape on a display in a manner such that the region overlapping the nearby object present on the near side of the travel path on which the vehicle travels is removed from the guide image.

2. The display device according to claim 1, wherein the processor is programmed to determine whether there is the nearby object on the near side of the travel path on which the vehicle travels after turning at the guide branch point.

3. The display device according to claim 1, wherein the processor is programmed to:
superimpose the guide image on a view seen through a windshield of the vehicle;
obtain an angle between a line connecting the vehicle and the nearby object and a width direction of the vehicle;
obtain a position on the windshield at which the nearby object is visually recognized by an occupant of the vehicle, based on the obtained angle; and
determine a position of the non-drawing region, based on the obtained position.

4. The display device according to claim 1, wherein:
the guide image is an image representing an arrow; and
the processor is programmed to extend a head side of the arrow of the guide image forward in the travel direction along the travel path.

5. The display device according to claim 1, wherein the processor is programmed to display the guide image in a superimposed manner on a near side of a far-side nearby object present on a far side of the travel path on which the vehicle travels.

6. The display device according to claim 1, wherein the processor is programmed to display the guide image as a virtual image.

7. The display device according to claim 1, wherein the guide image is displayed at such a position that the guide image is spaced upwardly from a road surface when visually recognized.

8. The display device according to claim 1, wherein:
the guide image is an image of an arrow indicating the travel direction of the vehicle that travels on the travel path after leaving the guide branch point; and
the processor is programmed to display a head of the arrow in a region not overlapping the nearby object.

9. The display device according to claim 1, wherein the nearby object is at least one of a building, a road sign, and a moving object.

10. A computer-readable storage medium storing a computer-executable program that causes a computer to display a guide image on a display mounted on a vehicle so as to be visually recognized such that the guide image is superimposed on a view ahead of the vehicle, the guide image providing guidance about a travel direction of the vehicle that travels on a travel path after leaving a guide branch point, the program causing the computer to perform functions comprising:
obtaining a captured image of the view ahead of the vehicle;
obtaining three-dimensional map information from a server;
generating a three-dimensional map based on the obtained three-dimensional map information;
comparing the captured image with the generated three-dimensional map;
based on the comparison, correcting any shift between the captured image and the generated three-dimensional map to create a corrected three-dimensional map;
arranging the guide image on the travel path on which the vehicle travels after leaving the guide branch point in the three-dimensional map, based on a result of the comparison; and
obtaining a shape of the guide image that is visually recognized from a position of the vehicle in the corrected three-dimensional map;
obtaining a first distance from the vehicle to a nearby object, based on a size of the nearby object;
obtaining a second distance from the vehicle to a road end on a near side of the travel path;
determining whether there is the nearby object present on the near side of the travel path on which the vehicle travels based on a determination that the first distance is less than or equal to the second distance;
correcting the guide image such that a region overlapping the nearby object is set as a non-drawing region excluded from a drawing target when there is the nearby object present on the near side of the travel path on which the vehicle travels; and
displaying the guide image having the obtained shape in a manner such that the region overlapping the nearby object present on the near side of the travel path on which the vehicle travels is removed from the guide image.

* * * * *